United States Patent
Liu et al.

(10) Patent No.: US 10,715,210 B1
(45) Date of Patent: Jul. 14, 2020

(54) SYNCHRONIZATION SIGNAL REPETITION PATTERN FOR A DISCOVERY REFERENCE SIGNAL IN NARROWBAND COMMUNICATIONS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/124,878

(22) Filed: Sep. 7, 2018

Related U.S. Application Data

(60) Provisional application No. 62/588,192, filed on Nov. 17, 2017.

(51) Int. Cl.
| | |
|---|---|
| *H04B 1/713* | (2011.01) |
| *H04B 1/7143* | (2011.01) |
| *H04J 1/06* | (2006.01) |
| *H04B 1/7136* | (2011.01) |

(52) U.S. Cl.
CPC .......... *H04B 1/713* (2013.01); *H04B 1/7136* (2013.01); *H04B 1/7143* (2013.01); *H04J 1/065* (2013.01)

(58) Field of Classification Search
CPC .... H04B 1/7073; H04B 1/713; H04B 1/7136; H04B 1/71365; H04B 1/7143; H04B 2001/7156; H04B 2001/71563; H04B 2001/71566; H04L 7/00; H04L 7/02; H04L 7/04; H04L 7/041; H04J 1/00; H04J 1/065
USPC ....... 375/132–137, 145, 149, 259, 260, 368; 370/208, 310, 344, 350; 455/500, 502, 455/517, 525
See application file for complete search history.

(56) References Cited

U.S. PATENT DOCUMENTS

| | | | |
|---|---|---|---|
| 2016/0205692 A1* | 7/2016 | Zhang | H04W 48/12 370/329 |
| 2017/0257139 A1* | 9/2017 | Axnas | H04L 5/0007 |
| 2018/0062698 A1* | 3/2018 | Wang | H04B 1/713 |
| 2019/0173521 A1* | 6/2019 | Liu | H04B 1/7143 |
| 2019/0181995 A1* | 6/2019 | Liu | H04L 5/0035 |

OTHER PUBLICATIONS

International Search Report and Written Opinion—PCT/US2018/050222—ISA/EPO—dated Nov. 30, 2018.

(Continued)

*Primary Examiner* — Young T Tse
(74) *Attorney, Agent, or Firm* — Arent Fox LLP

(57) ABSTRACT

There is a need for a mechanism that increases the UE's chance of properly receiving the NPSS and/or NSSS when frequency hopping is used for narrowband communications in the unlicensed frequency spectrum. The present disclosure provides a solution by transmitting the NPSS and NSSS using a synchronization signal repetition pattern in order to increase the detection probability for the DRS, so that synchronization and/or cell acquisition may be achieved with a reduced number of visits to the anchor channel, thereby reducing synchronization delay and increasing the QoS.

64 Claims, 18 Drawing Sheets

(56) References Cited

OTHER PUBLICATIONS

Panasonic: "Multiple PRBs Operation for NB-IoT", 3GPP Draft, R1-161004, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016 (Feb. 14, 2016), XP051054308, 2 Pages, Retrieved from the Internet: URL:http://www.3gpp.org/ftp/Meetings_3GPP_SYNC/RAN1/Docs/ [retrieved on Feb. 14, 2016].
QUALCOMM Incorporated: "Design Principles of NB-IoT SYNC Channel", 3GPP RAN1 Meeting #83, R1-157068 Nov. 15-22, 2015, XP051003362, Retrieved from the Internet:URL:http://www.3gpp.org/ftp/Meetings_3GPP_SYNC/RAN1/Docs/,6 pages.
QUALCOMM Incorporated: "Sequence Design for NB-IoT SYNC Channel", 3GPP RAN1 Meeting #83, R1-157069, Nov. 15-22, 2015, 5 pgs.

\* cited by examiner

| Number of Sync blocks | Swapping Sequences |
|---|---|
| 2 | all possible is the same |
| 4 | [0 0 1 0], [1 0 1 1] |
| 6 | [0 0 1 0 1 1], [1 0 0 0 1 0], [1 0 1 1 1 0] |
| 8 | [0 0 0 1 0 1 1 0], [0 0 0 0 1 1 0 1 0]<br>[0 0 1 0 1 1 1 0], [1 0 0 0 1 0 1 1]<br>[1 0 0 1 0 1 1 1], [1 0 1 0 0 1 1 1] |
| 10 | [0 0 0 1 0 0 1 1], [0 0 0 1 1 0 1 0 1 1]<br>[0 0 1 0 0 1 0 1 1], [0 0 1 0 1 0 1 0 0 1 1 1]<br>[0 0 1 0 1 1 1 0 1 1], [0 0 1 1 0 1 0 1 1 1]<br>[1 0 0 0 0 1 0 1 1 0], [1 0 0 0 0 1 1 0 1 0]<br>[1 0 0 0 1 0 1 1 0], [1 0 0 1 0 1 1 1 1 0]<br>[1 0 1 0 0 1 1 1 1 0], [1 0 1 1 0 0 0 1 0]<br>[1 0 1 1 1 1 0 0 1 0] |

SYNCHRONIZATION SIGNAL REPETITION PATTERN FOR A DISCOVERY REFERENCE SIGNAL IN NARROWBAND COMMUNICATIONS

CROSS-REFERENCE TO RELATED APPLICATION(S)

This application claims the benefit of U.S. Provisional Application Ser. No. 62/588,192, entitled "A SYNCHRONIZATION SIGNAL REPETITION PATTERN FOR A DISCOVERY REFERENCE SIGNAL IN NARROWBAND COMMUNICATIONS" and filed on Nov. 17, 2017, which is expressly incorporated by reference herein in its entirety.

BACKGROUND

Technical Field

The present disclosure relates generally to communication systems, and more particularly, to a synchronization signal repetition pattern used to increase the detection probability for a discovery reference signal (DRS) by a user equipment (UE) configured for narrowband communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings. However, supporting a six RB (e.g., 1.08 MHz) communication bandwidth and/or a single RB (e.g., 180 kHz) communication bandwidth operating in the unlicensed frequency spectrum may not always be possible.

Thus, there is a need for a mechanism that overcomes the bandwidth restrictions for narrowband communications using the unlicensed frequency spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for narrowband communications may be six RBs with various repetition levels to support low complexity devices and high efficiency power amplifiers (PA). In certain NB-IoT configurations, the channel bandwidth for narrowband communications may be restricted to a single tone (e.g., 3.75 kHz) to support low complexity devices and high efficiency PA.

However, supporting a six RB (e.g., 1.08 MHz) communication bandwidth and/or a single tone (e.g., 3.75 kHz, etc.) communication bandwidth may not be possible due to certain power spectral density (PSD) restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.).

Coverage enhancements, such as frequency hopping, for narrowband devices (e.g., UEs and/or base stations) may be employed to provide more reliable communications within a narrowband communication system, and in order to overcome the PSD restrictions and bandwidth requirements for narrowband communications that use the unlicensed frequency spectrum.

For example, a UE and/or base station may perform frequency hopping by monitoring, receiving, and/or transmitting signals by switching a carrier among different frequency channels (e.g., an anchor channel and a plurality of non-anchor hopping channels) to exploit the frequency diversity of the unlicensed frequency spectrum.

The anchor channel may be used to carry DRS (e.g., a primary synchronization signal (NPSS), a narrowband primary synchronization signal (NSSS), a narrowband physical broadcast control channel (NPBCH), and SIB bandwidth reduced (SIB-BR) etc.). The NPSS and NSSS may be used by a UE for initial synchronization, cell acquisition, timing estimation, and/or frequency estimation. Further, the anchor channel may be used to indicate a frequency hopping configuration that includes the anchor channel and a plurality of non-anchor hopping channels that may be used to communicate DL and UL data.

After K number of hops between non-anchor hopping channels, the UE may return to the anchor channel to monitor for DRS in order to reduce synchronization delay. However, because NB-IoT UEs and/or eMTC UEs may be located deep within a building (e.g., smart gas meters, smart water meters, etc.), a DRS that includes a small number of NPSS and/or NSSS may not be properly received due to, among others, the attenuation of the DRS prior to reaching the UE. Consequently, the UE may experience a synchronization delay. When a synchronization delay occurs, the UE may not be able to receive DL data and/or send UL data, which reduces the quality of service (QoS) and consumes an undesirable amount of battery power.

Thus, there is a need for a mechanism that increases the UE's chance of properly receiving the NPSS and/or NSSS.

The present disclosure provides a solution by transmitting the NPSS and NSSS using a synchronization signal repetition pattern in order to increase the detection probability for the DRS, so that synchronization and/or cell acquisition may be achieved with a reduced number of visits to the anchor channel, thereby reducing synchronization delay and increasing the QoS.

In an aspect of the disclosure, a method, a computer-readable medium, and an apparatus are provided. In one example, the apparatus may be a base station. In certain configurations, the apparatus may transmit information indicating a narrowband frequency hopping pattern to at least one UE. In certain aspects, the narrowband frequency hopping pattern may include an anchor channel and a plurality of non-anchor channels. In certain other aspects, the narrowband frequency hopping pattern may include a first hopping period associated with the anchor channel and a second hopping period associated with a plurality of non-anchor channels. In certain other configurations, the apparatus may transmit a plurality of narrowband synchronization signals using a synchronization signal repetition pattern during a first portion of the first hopping period on the anchor channel.

In another example, the apparatus may be a UE. In certain configurations, the apparatus may receive information indicating a narrowband frequency hopping pattern from a base station. In certain aspects, the narrowband frequency hopping pattern may include an anchor channel and a plurality of non-anchor channels. In certain other aspects, the narrowband frequency hopping pattern may include a first hopping period associated with the anchor channel and a second hopping period associated with a plurality of non-anchor channels. In certain other configurations, the apparatus may receive a plurality of narrowband synchronization signals in a synchronization signal repetition pattern during a first portion of the first hopping period on the anchor channel. In certain other configurations, the apparatus may perform timing estimation based at least in part on the plurality of synchronization signals received during the first portion of the first hopping period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4E is a table illustrating different synchronization signal swapping patterns that may be used to transmit a plurality of synchronization signals in accordance with certain aspects of the disclosure.

DETAILED DESCRIPTION

Figure 1:
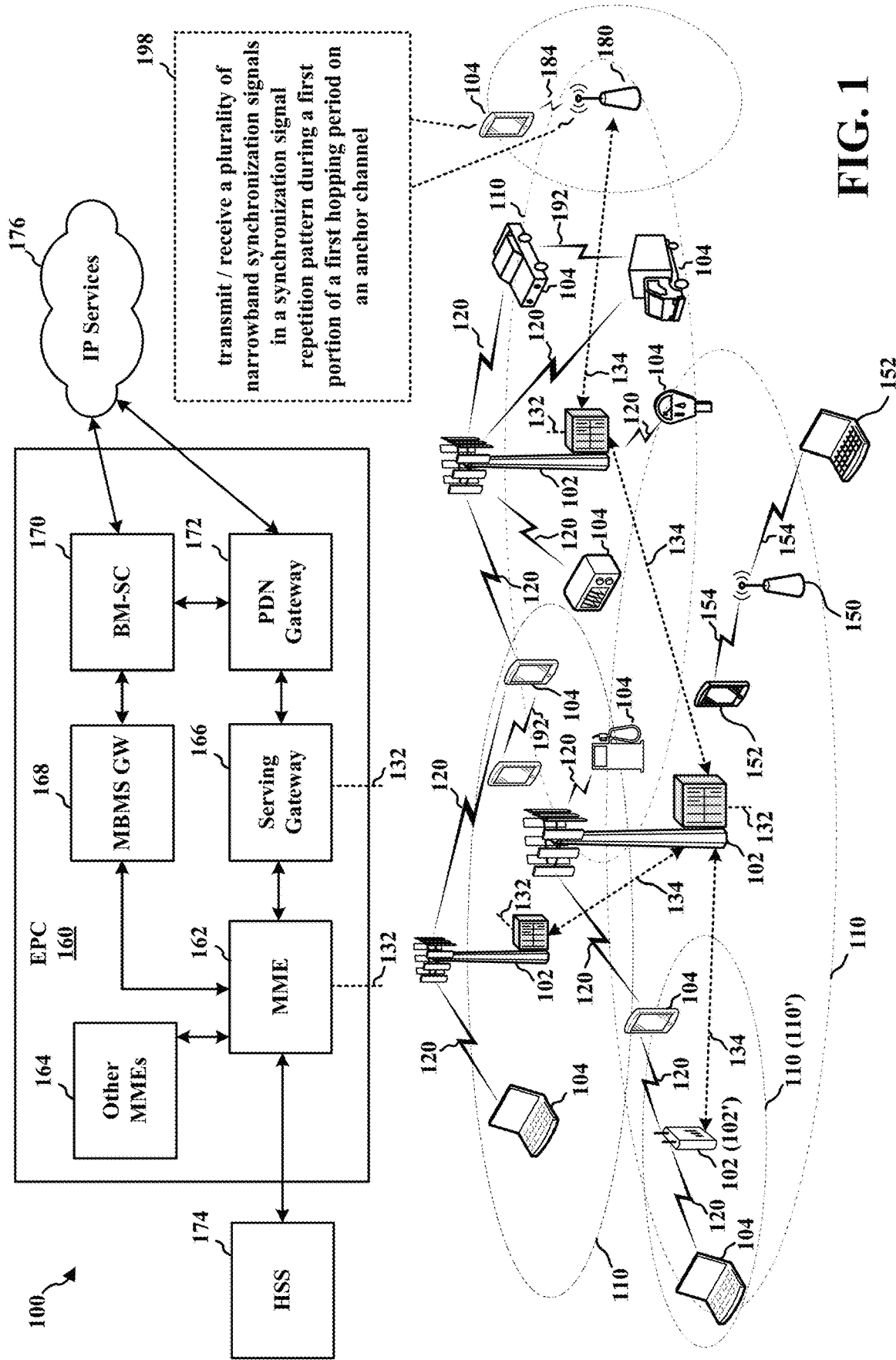
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to transmit a plurality of narrowband synchronization signals in a synchronization signal repetition pattern during a first portion of a first hopping period on an anchor channel, and the UE 104 may be configured to receive a plurality of narrowband synchronization signals in a synchronization signal repetition pattern during a first portion of a first hopping period on an anchor channel (198), e.g., as described below in connection with any of FIGS. 2A-11.

Figure 2A:
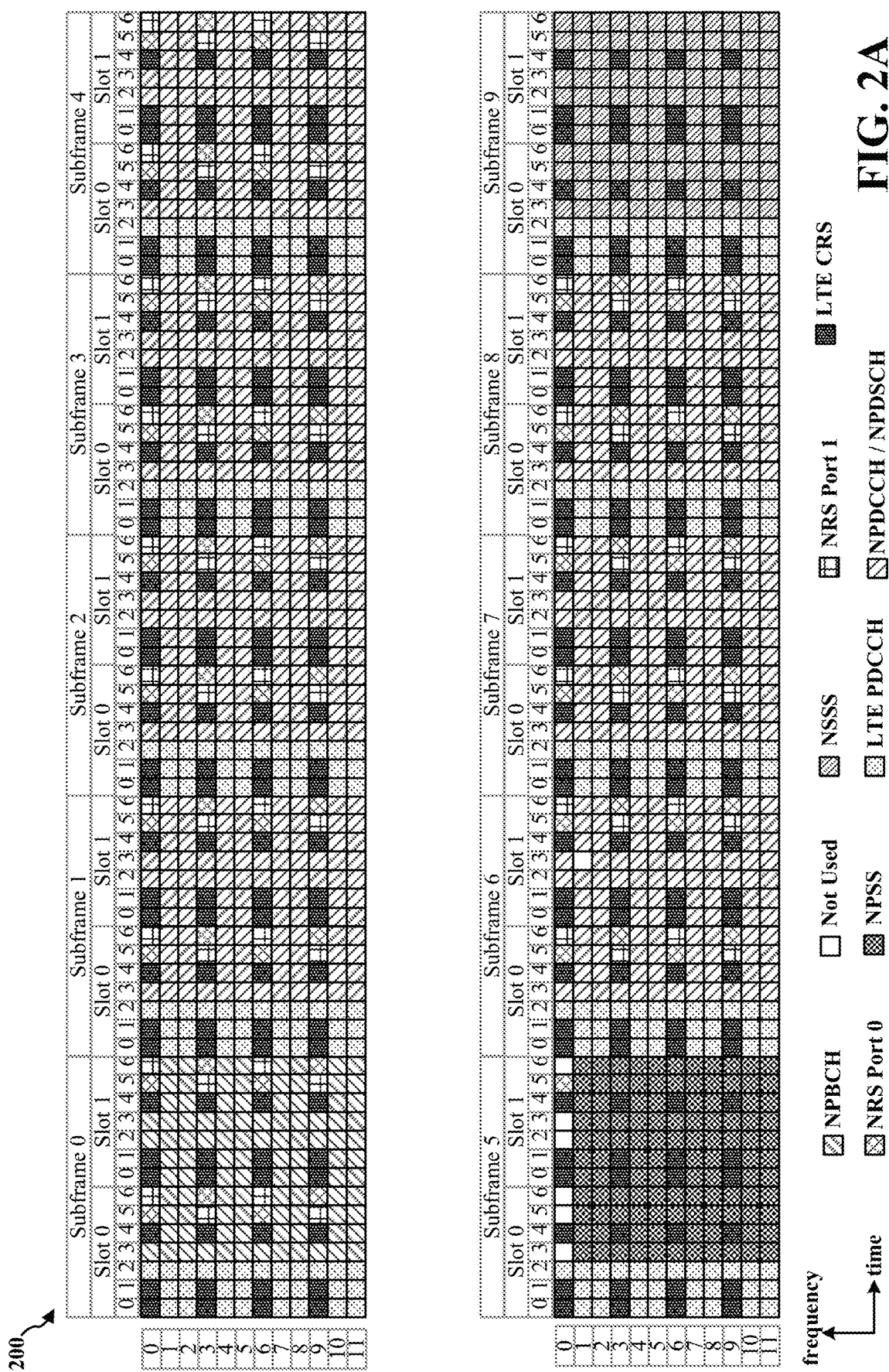
FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/stand-alone deployment inside an LTE carrier (even radio frame), and an NB frame structure for guard band/standalone deployment inside an LTE carrier (even radio frame), respectively.
Figure 2B:
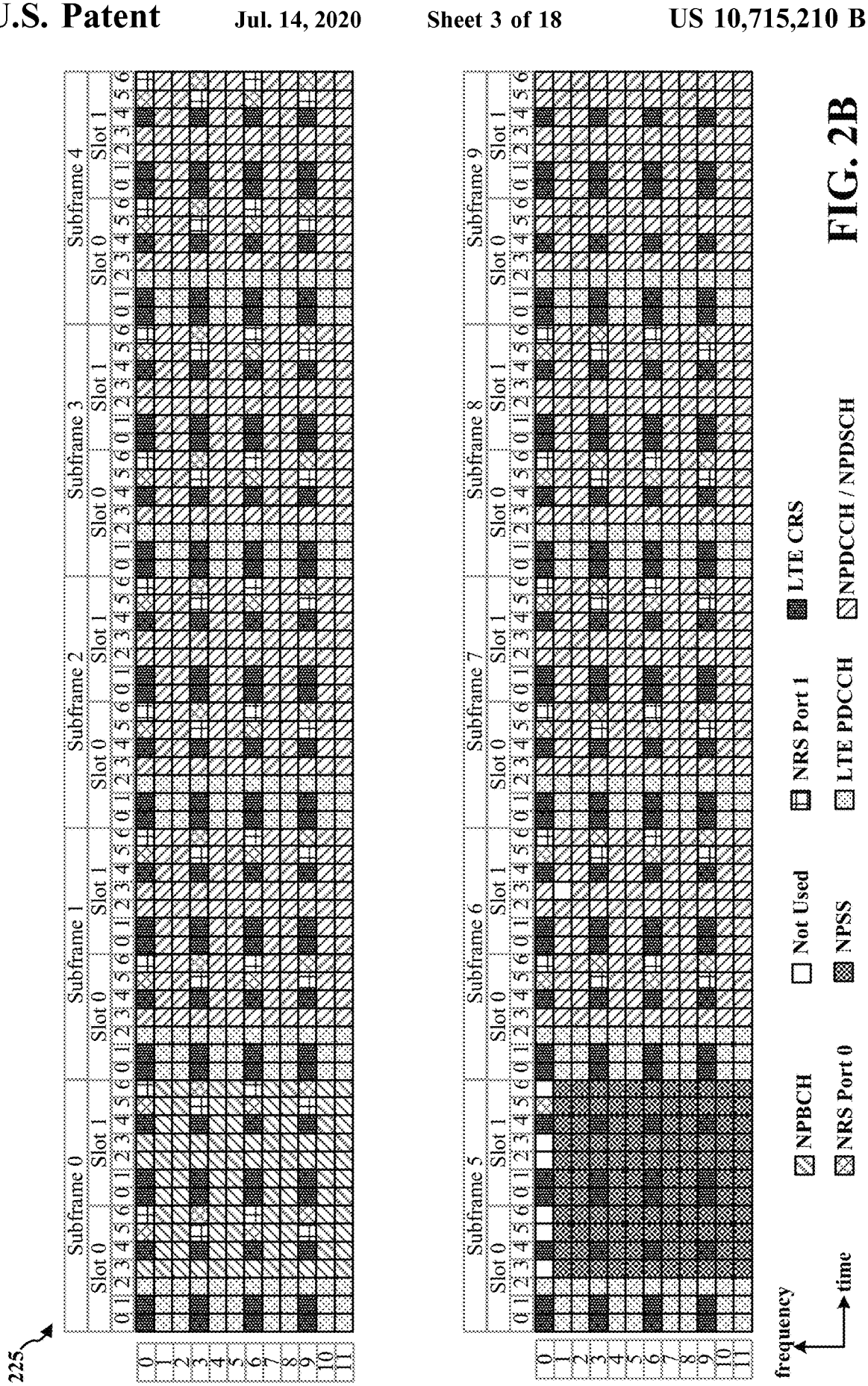
Figure 2C:
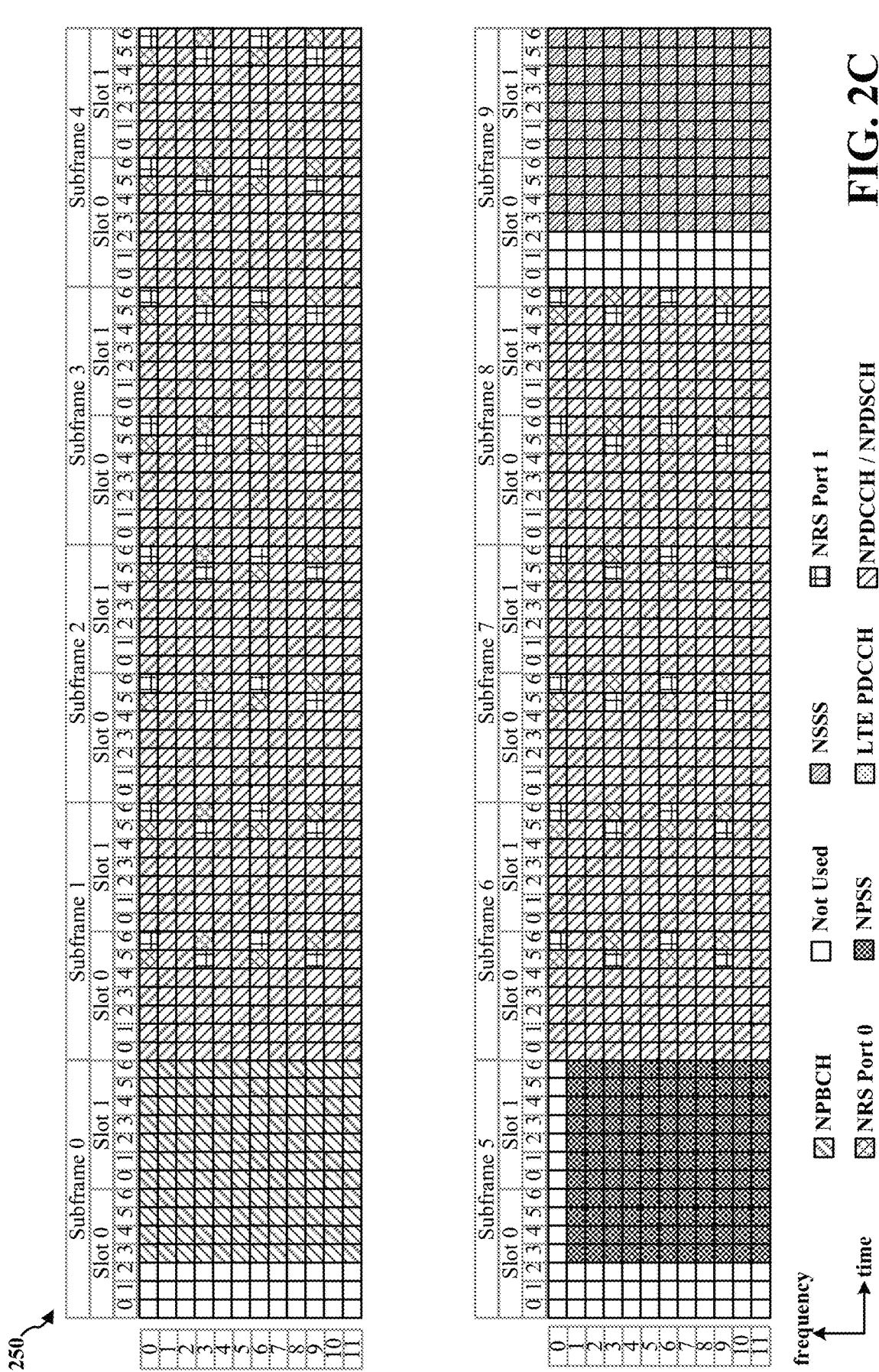
Figure 2D:
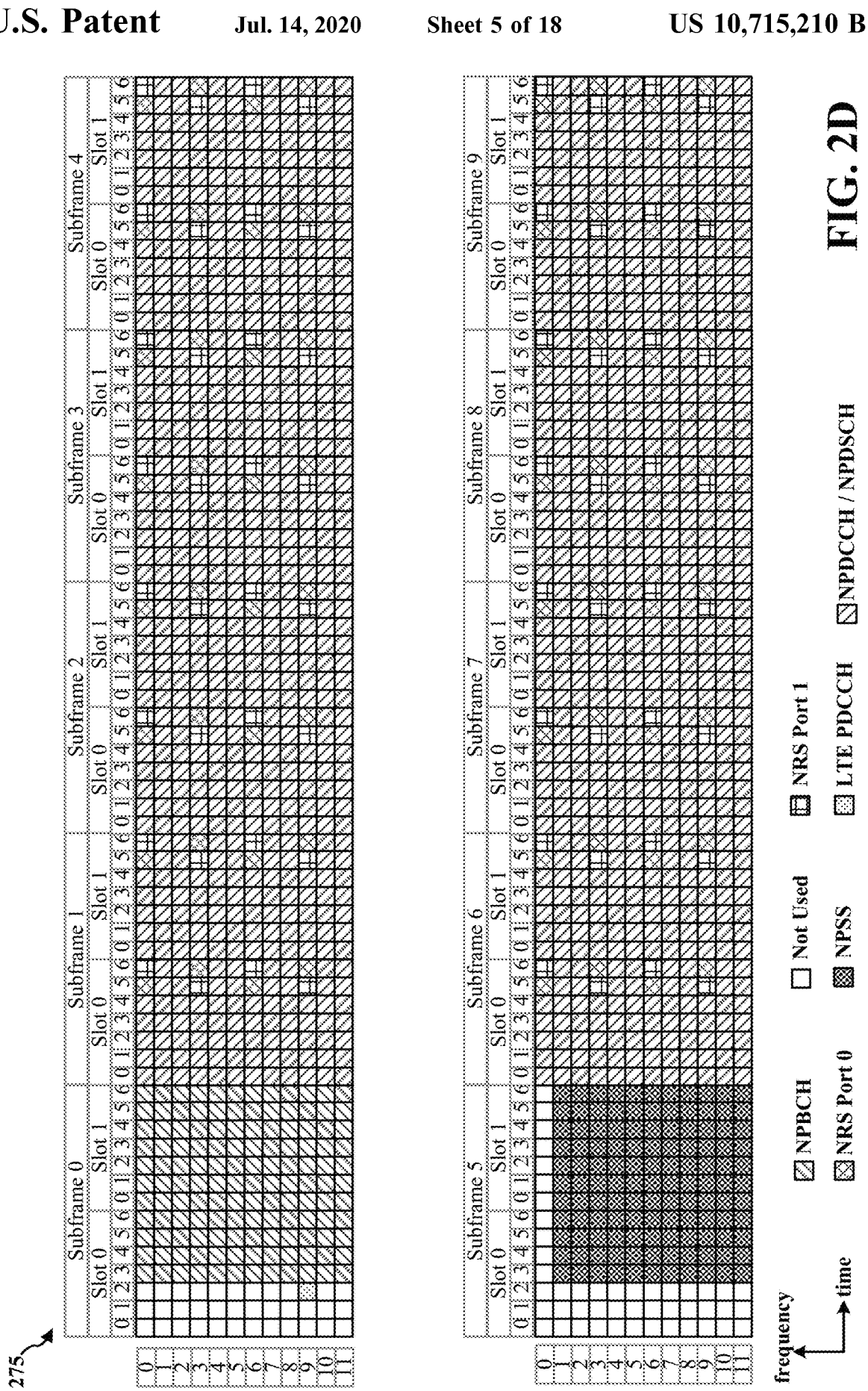

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The standalone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NPSS may be transmitted in subframe 5 of even and odd radio frames, and an NSSS may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NPBCH may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
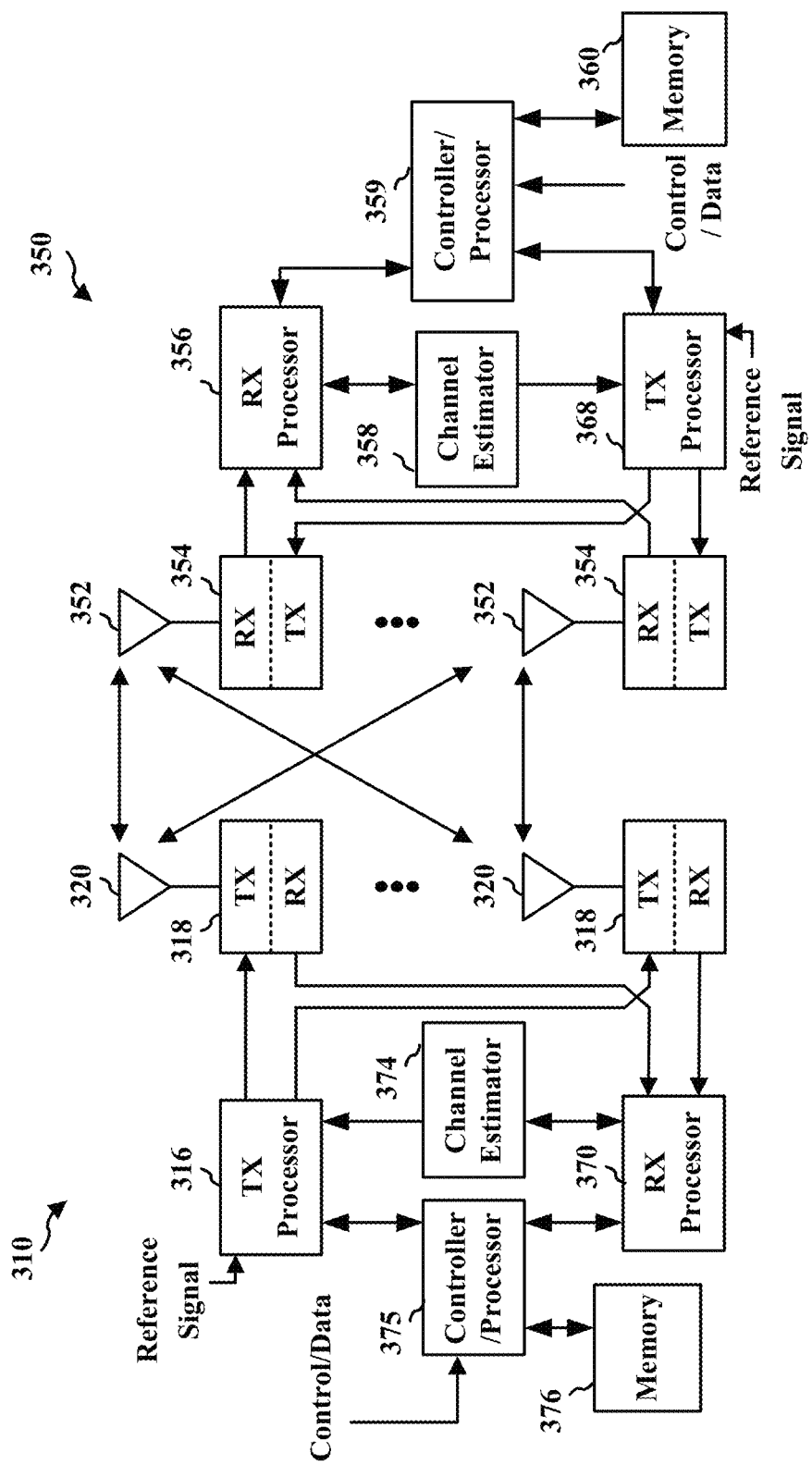
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for narrowband communications may be six RBs with various repetition levels to support low complexity devices and high efficiency PA. In certain NB-IoT configurations, the channel bandwidth for narrowband communications may be restricted to a single tone (e.g., 3.75 kHz) to support low complexity devices and high efficiency PA.

However, supporting a six RB (e.g., 1.08 MHz) communication bandwidth and/or a single tone (e.g., 3.75 kHz, etc.) communication bandwidth may not be possible due to certain PSD restrictions (e.g., transmission power restrictions) and bandwidth requirements for narrowband communications that use the unlicensed frequency spectrum (e.g., 5 GHz unlicensed frequency spectrum, the sub-2.4 GHz unlicensed frequency spectrum, or the sub-GHz unlicensed frequency spectrum, etc.).

For example, the PSD used for the digital modulation (DTS) of narrowband communication signals in the United States may be limited to a maximum of 8 dBm/3 kHz. Hence, a UE may not be able to transmit a single tone transmission using full power in the unlicensed spectrum because the maximum PSD is limited to a bandwidth (e.g., 3 kHz) that is smaller than a single tone (e.g., 3.75 kHz). Further, the system bandwidth for narrowband communications using the unlicensed spectrum in the United States may be restricted to, e.g., 500 kHz when frequency hopping is used. Hence, a six RB narrowband communication bandwidth may not be supported in the United States because narrowband communications may be restricted to a bandwidth (e.g., 500 kHz) that is smaller than six RBs (e.g., 1.08 MHz).

In certain configurations, a hybrid system may be employed that uses a DTS mode in which the PSD limit is still applicable, but without the minimum bandwidth constraint. In certain other configurations, a frequency hopping mode may be employed in which the system is not constrained to a minimum number (e.g., 10, 20, 30, 50, 100, etc.) of frequency channels. An NB-IoT and/or eMTC base station may use either the hybrid mode and/or the frequency hopping mode, while an NB-IoT and/or eMTC UE may use the frequency hopping mode.

Coverage enhancements, such as frequency hopping, for narrowband devices (e.g., UEs and/or base stations) may be employed to provide more reliable communications within a narrowband communication system, and to overcome the PSD restrictions and bandwidth requirements for narrowband communications that use the unlicensed frequency spectrum, e.g. as described below with respect to FIG. 4A.

Figure 4A:
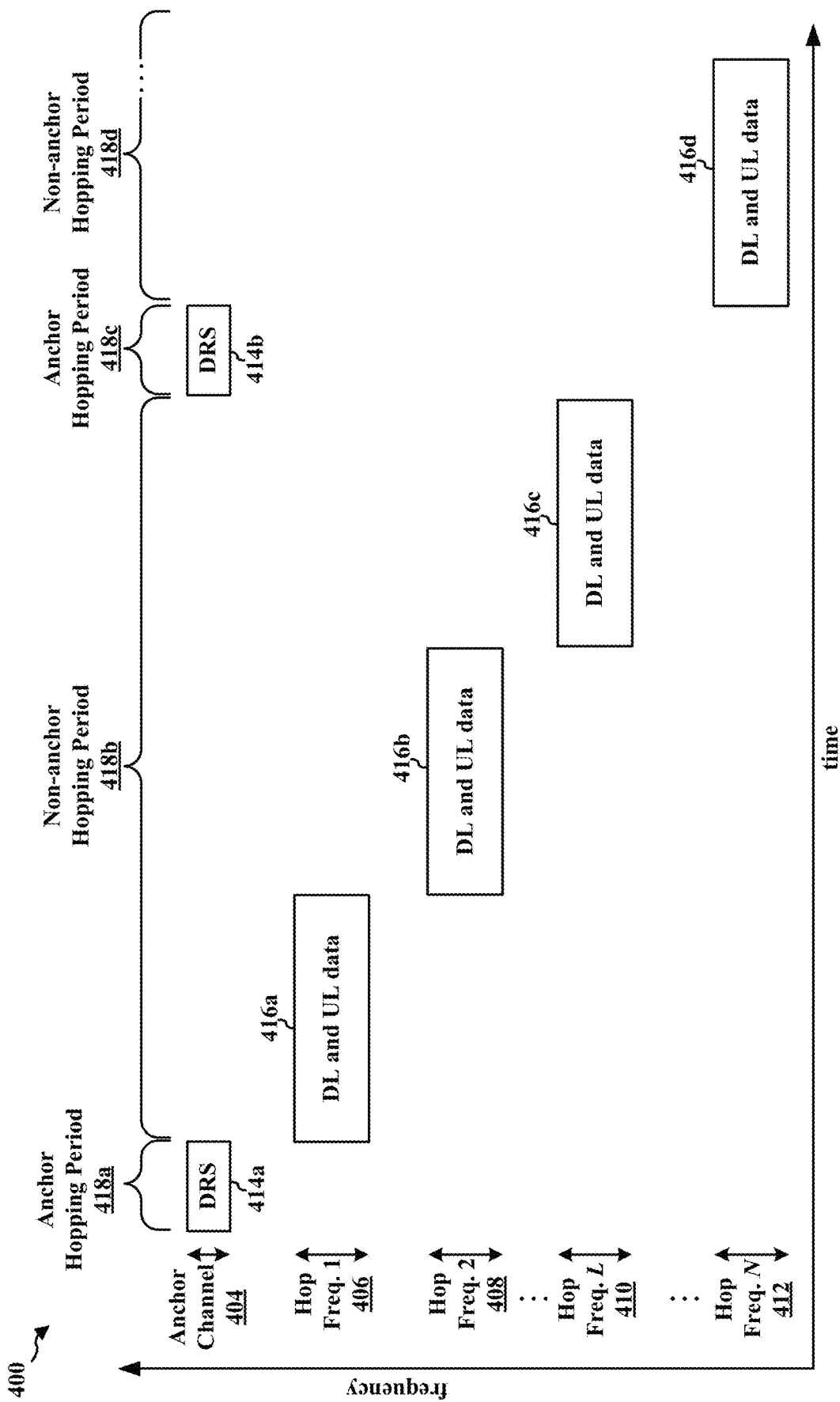
FIG. 4A illustrates a frequency hopping pattern that may be used for narrowband communications in the unlicensed frequency spectrum between a base station and a UE in accordance with certain aspects of the disclosure.

FIG. 4A illustrates a frequency hopping pattern 400 that may be used for narrowband communications in the unlicensed frequency spectrum between a base station and a UE in accordance with certain aspects of the disclosure.

For example, a UE and/or base station may use the frequency hopping pattern 400 illustrated in FIG. 4A to monitor, receive, and/or transmit signals by switching a carrier among different frequency channels (e.g., an anchor channel 404 and a plurality of non-anchor hopping channels 406, 408, 410, 412) to exploit the frequency diversity of the unlicensed frequency spectrum. The anchor channel 404 may be used to carry DRS (e.g., NPSS, NSSS, NPBCH, and SIB-BR etc.). The NPSS and NSSS may be used by the UE for initial synchronization, cell acquisition, timing estimation, and/or frequency estimation. Each of the plurality of non-anchor hopping channels 406, 408, 410, 412 may be used to communicate DL and UL data.

The anchor channel 404 may also be used to carry information that indicates the frequency hopping pattern 400 to the UE. For example, the information may indicate which narrowband channels (e.g., anchor channel 404, hop frequency 1 406, hop frequency 2, hop frequency L, hop frequency N, etc.) in a wideband channel may be used for narrowband communications. Out of the maximum number of narrowband channels (e.g., 100 narrowband channels) within the wideband channel, the information may indicate that communications between the base station and the UE may occur on a subset of the maximum number of narrowband channels (e.g., 15 out of 100 of the narrowband channels).

The information may also indicate one or more anchor hopping periods 418a, 418c each associated with an anchor hopping frame 414a, 414b, and one or more non-anchor hopping periods 418b, 418d each associated with a predetermined number of non-anchor hopping frames 416a, 416b, 416c, 416d. Each of the anchor hopping frames 414a, 414b may include a first number of radio frames, and each of the non-anchor hopping frames 416a, 416b, 416c, 416d may include a second number of radio frames. The second number of radio frames may be the same or different than the first number of radio frames.

For example, each of the anchor hopping frames 414a, 414b may include 2 radio frames, and hence, each of the anchor hopping periods 418a, 418c may be 20 ms in duration. Each of the non-anchor hopping frames 416a, 416b, 416c, 416d, etc. may include 14 radio frames, and hence, each of the non-anchor hopping periods 418b, 418d may be 140 ms in duration.

In order to increase the probability of successful communication of DL data and/or UL data, a particular duration (e.g., dwell period) of each of the non-anchor hopping frames 416a, 416b, 416c, 416d may be used to accommodate a minimum number of DL control repetitions, DL data repetitions, UL control repetitions, and/or UL data repetitions. To ensure equal channel occupancy for each of the hopping frequencies (e.g., the anchor channel 404, hop frequency 1 406, hop frequency 2, hop frequency L, hop frequency N, etc.), the frequency hopping system may perform multiple non-anchor hops (e.g., non-anchor hopping frames 416a, 416b, 416c) within a non-anchor hopping period 418b before returning to anchor channel 404.

Although three non-anchor hopping frames 416a, 416b, 416c are depicted in non-anchor hopping period 418b, more or fewer than three hopping frames may be included in non-anchor hopping period 418b without departing from the scope of the present disclosure. For simplicity, only one non-anchor hopping frame 416d is depicted in non-anchor hopping period 418d. However, each non-anchor hopping period 418b, 418d may include the same number of non-anchor hopping frames. In other words, in the example illustrated in FIG. 4A, the non-anchor hopping period 418d may also include three non-anchor hopping frames (two of which are not depicted) that each carry DL data and UL data on different hopping frequencies. In certain other configurations, the non-anchor hopping periods 418b, 418d may each include a different number of non-anchor hopping frames. The UE 504 may monitor hop frequencies 1-L 406, 408, 410 before returning to the anchor channel 404. The hop frequency indices (e.g., 1, 2, L, N) illustrated in FIG. 4A are logical indices. Out of N' hopping frequencies, N frequencies may be used in the frequency hopping pattern, where N<N'. The hop frequencies may then be label 1-N.

After K number of hops between non-anchor hopping channels (e.g., where K is equal to 3 in the example illustrated in FIG. 4A), the UE may return to the anchor channel 404 to monitor for DRS in order to reduce synchronization delay. In other words, at the end of each non-anchor hopping period 418b, 418d, the base station and the UE may return to the anchor channel 404 for the communication of DRS in an anchor hopping frame 414a, 414b. Consider an example not illustrated in FIG. 4A in which each non-anchor hopping period 418b, 418d includes 7 non-anchor hopping frames that each include 2 radio frames. Here, a duration of the non-anchor hopping period may be 140 ms, and the duration of the anchor hopping periods 418a, 418c may be 20 ms. Consequently, the UE may attempt cell acquisition, synchronization, timing estimation, and/or frequency estimation every 140 ms.

Because an NB-IoT/eMTC UE may be located deep within a building (e.g., smart gas meters located within a building's basement, etc.), a DRS that includes a small number of NPSS and/or NSSS may not be properly received due to signal attenuation, among other things.

When the DRS is not properly received in an anchor hopping frames 414a, 414b, the UE may experience a synchronization delay due to the extended dwell time in the non-anchor hopping period (e.g., 140 ms). When a synchronization delay occurs, the UE may not be able to receive DL data and/or send UL data in the non-anchor hopping frames 416a, 416b, 416c, 416d, which reduces the QoS. Thus, there is a need for a mechanism that increases the probability of properly receiving the NPSS and/or NSSS by the UE.

The present disclosure provides a solution by transmitting the NPSS and NSSS using a synchronization signal repetition pattern in order to increase the detection probability for the DRS, e.g., as described below in connection with any of FIGS. 4B-11.

Figure 4B:
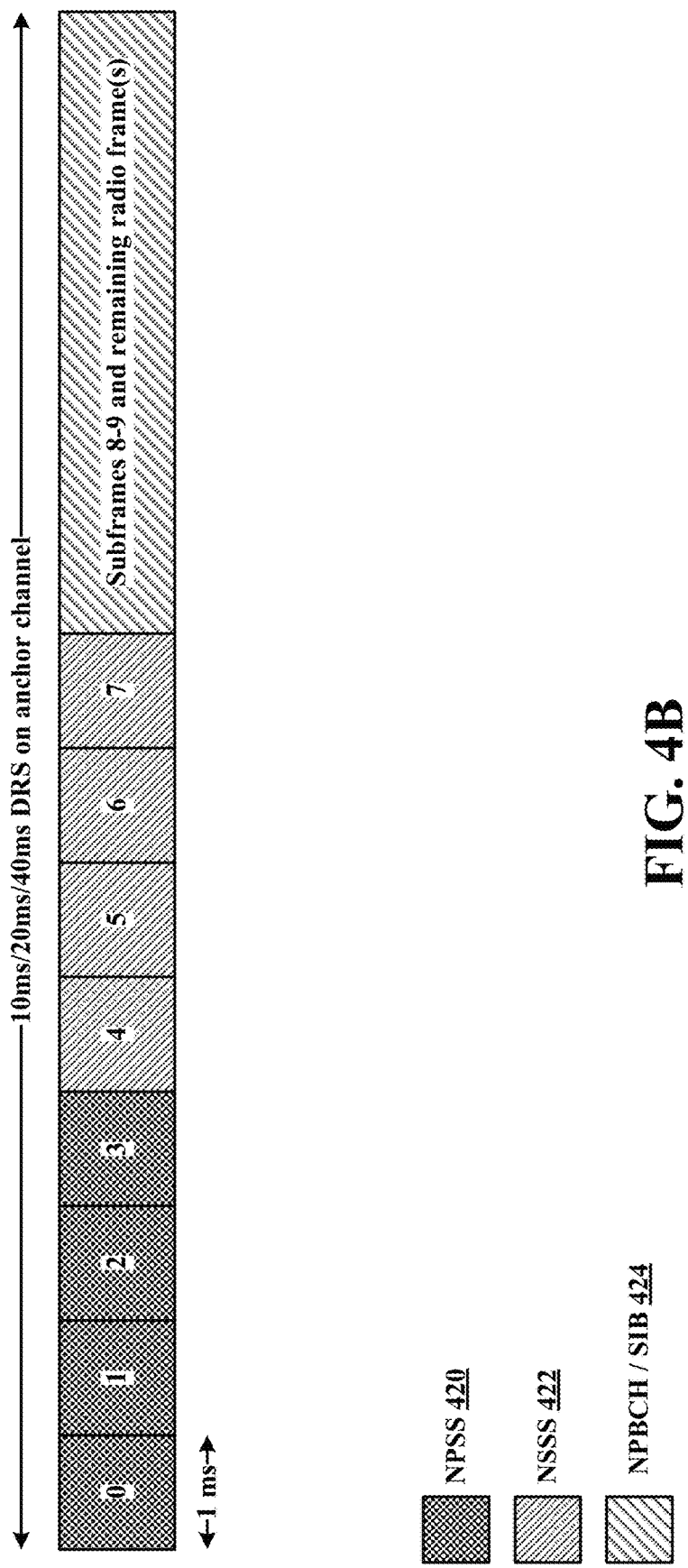
FIG. 4B illustrates a synchronization signal repetition pattern that may be used to transmit a plurality of synchronization signals in accordance with certain aspects of the disclosure.

FIG. 4B illustrates an anchor hopping frame 415 that includes a synchronization signal repetition pattern that may be used to transmit a plurality of synchronization signals on the anchor channel in accordance with certain aspects of the disclosure.

When the anchor hopping frame 415 includes a single radio frame (e.g., 10 subframes of 1 ms duration), the duration of the anchor hopping frame 415 may be 10 ms. When the anchor hopping frame 415 includes two radio frames (e.g., 20 subframes of 1 ms duration), the duration of the anchor hopping frame 415 may be 20 ms. When the anchor hopping frame 415 includes four radio frames (e.g., 40 subframes of 1 ms duration), the duration of the anchor hopping frame 415 may be 40 ms.

As illustrated in FIG. 4B, the synchronization signal repetition pattern may include a first set of NPSS 420 in a first set of contiguous subframes (e.g., subframes 0-4) and a second set of NSSS 422 in a second set of contiguous subframes (e.g., subframes 5-8).

Although four repetitions for each of the NPSS 420 and NSSS 422 are illustrated in FIG. 4B, two or more repetitions for each of the NPSS 420 and NSSS 422 may be included in the synchronization signal repetition pattern without departing from the scope of the present disclosure.

The NPBCH/SIB-BR 424 may be transmitted in subframes 8 and 9 of the radio frame used to transmit the NPSS 420 and the NSSS 422. The NPBCH/SIB-BR 424 may also be transmitted in the subframes of one or more additional radio frames that occupy the anchor hopping frame 415.

The NPSS 420 may comprise a Zadoff-Chu sequence transmitted in a predetermined number of OFDM symbols (e.g., 11 OFDM symbols, 14 OFDM symbols, etc.) with an overlaid cover code of a particular length (e.g., 11, 14, etc.) used for single subframe detection by the UE. The UE may search for the NPSS 420 using a correlator that is matched to the Zadoff-Chu sequence of the NPSS 420. The timing and/or frequency of the system may be determined by detecting the peak of the correlator matched output of the Zadoff-Chu sequence inside a timing hypothesis window. Certain properties associated with Zadoff-Chu sequences may be exploited to detect the peak of the correlated matched output.

A first property that may be exploited is the constant amplitude associated with Zadoff-Chu sequences. The constant amplitude of the Zadoff-Chu sequence may limit the peak-to-average radio, and hence, generate bounded and time-flat interference. A second property that may be exploited is that the cyclic auto-correlation of each Zadoff-Chu sequence may result in a single dirac-impulse at a time offset of zero. The second property may enable the UE to determine the timing offset by correlation.

However, because the length Zadoff-Chu sequence and/or cover code of the NPSS 420 may not be designed for multiple subframe detection, the UE may detect false peaks of the correlator matched output inside the timing hypothesis window that is caused by a previous NPSS subframe in the synchronization signal repetition pattern.

Consequently, the UE may not be able to determine the timing offset within an accuracy range. Hence, the present disclosure also provides a synchronization signal repetition pattern that may reduce the detection of false peaks of the correlator matched output, e.g., as described below in connection with FIGS. 4C and 4D.

Figure 4C:
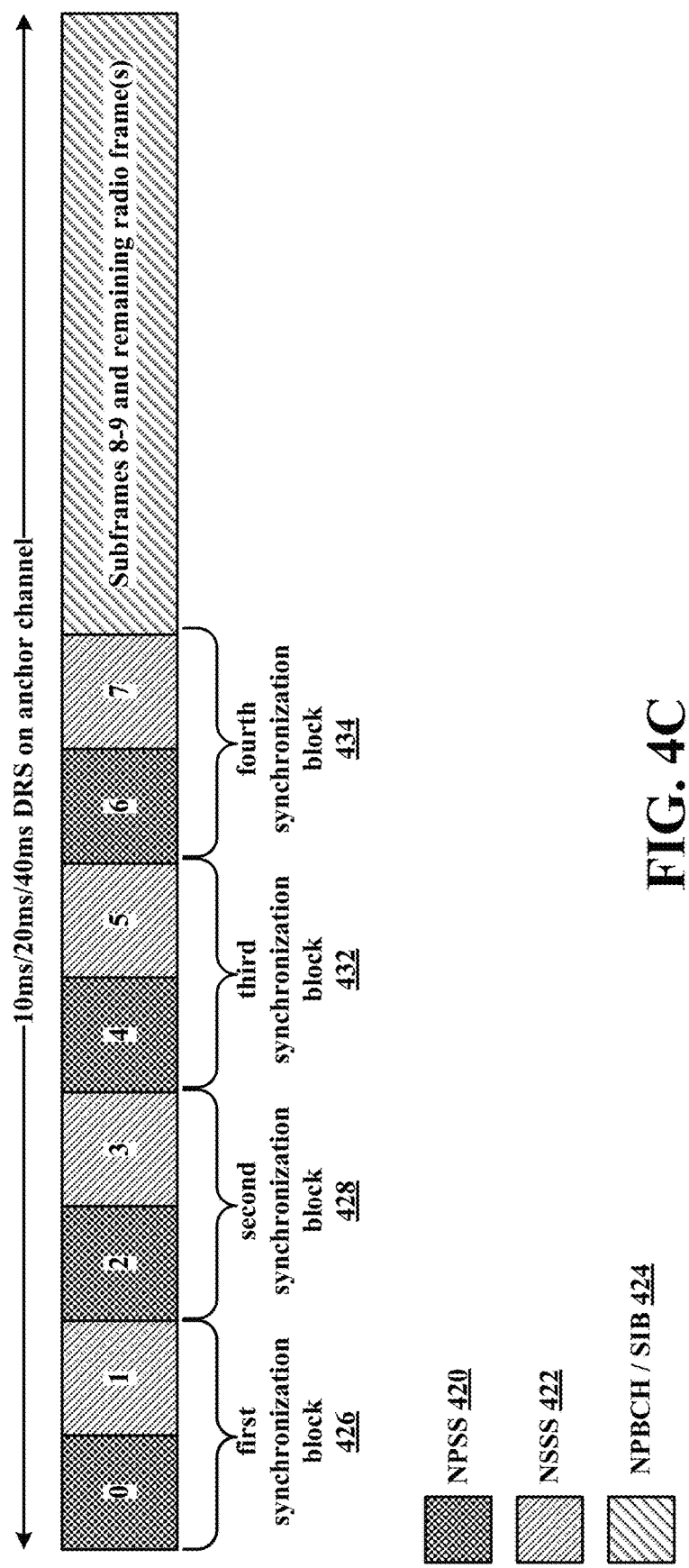
FIG. 4C illustrates a synchronization signal repetition pattern that may be used to transmit a plurality of synchronization signals in accordance with certain aspects of the disclosure.

FIG. 4C illustrates an anchor hopping frame 430 that includes a synchronization signal repetition pattern that may be used to transmit a plurality of synchronization signals on the anchor channel in accordance with certain aspects of the disclosure.

When the anchor hopping frame 430 includes a single radio frame (e.g., 10 subframes of 1 ms duration), the duration of the anchor hopping frame 430 may be 10 ms. When the anchor hopping frame 430 includes two radio frames (e.g., 20 subframes of 1 ms duration), the duration of the anchor hopping frame 430 may be 20 ms. When the anchor hopping frame 430 includes four radio frames (e.g., 40 subframes of 1 ms duration), the duration of the anchor hopping frame 430 may be 40 ms.

As illustrated in FIG. 4C, the synchronization signal repetition pattern may include a plurality of contiguous synchronization blocks 426, 428, 432, 434. In certain configurations, each of the plurality of contiguous synchronization blocks 426, 428, 432, 434 may include an NPSS 420 located in an NPSS subframe and an NSSS 422 located in an NSSS subframe that is contiguous with the NPSS subframe.

For example, in the first synchronization block 426, the NPSS 420 may be located in subframe 0 (e.g., NPSS subframe) and the NSSS 422 may be located in subframe 1 (e.g., NSSS subframe). In the second synchronization block 428, the NPSS 420 may be located in subframe 2 (e.g., NPSS subframe) and the NSSS 422 may be located in subframe 3 (e.g., NSSS subframe). In the third synchronization block 432, the NPSS 420 may be located in subframe 4 (e.g., NPSS subframe) and the NSSS 422 may be located in subframe 5 (e.g., NSSS subframe). In the fourth synchronization block 434, the NPSS 420 may be located in subframe 6 (e.g., NPSS subframe) and the NSSS 422 may be located in subframe 7 (e.g., NSSS subframe).

The NPBCH/SIB-BR 424 may be transmitted in subframes 8 and 9 of the radio frame used to transmit the NPSS 420 and the NSSS 422. The NPBCH/SIB-BR 424 may also be transmitted in the subframes of one or more additional radio frames that occupy the anchor hopping frame 430.

In certain configurations (not depicted in FIG. 4C), the synchronization repetition pattern may include a greater number of NPSS 420 than NSSS 422. Here, adjacent NPSS subframes (e.g., subframe 8 in the first radio frame and subframe 0 in the subsequent radio frame) located after the plurality of synchronization blocks 426, 428, 432, 434 may be separated by an NPBCH subframe or an SIB-BR subframe.

While the synchronization signal repetition pattern depicted in FIG. 4C may overcome some of the problems associated with the synchronization signal repetition pattern described above in connection with FIG. 4B, false peaks may still be detected at of the correlator matched output of the Zadoff-Chu sequence (e.g., NPSS) at intervals of 2 ms (e.g., since an NPSS 420 is transmitted every 2 ms using the synchronization signal repetition pattern depicted in FIG. 4C).

Hence, the present disclosure also provides a synchronization signal repetition pattern that may reduce the detection of false peaks of the correlator matched output by randomly swapping of the order of the NPSS/NSSS within certain synchronization blocks, e.g., as described below in connection with FIG. 4D.

Figure 4D:
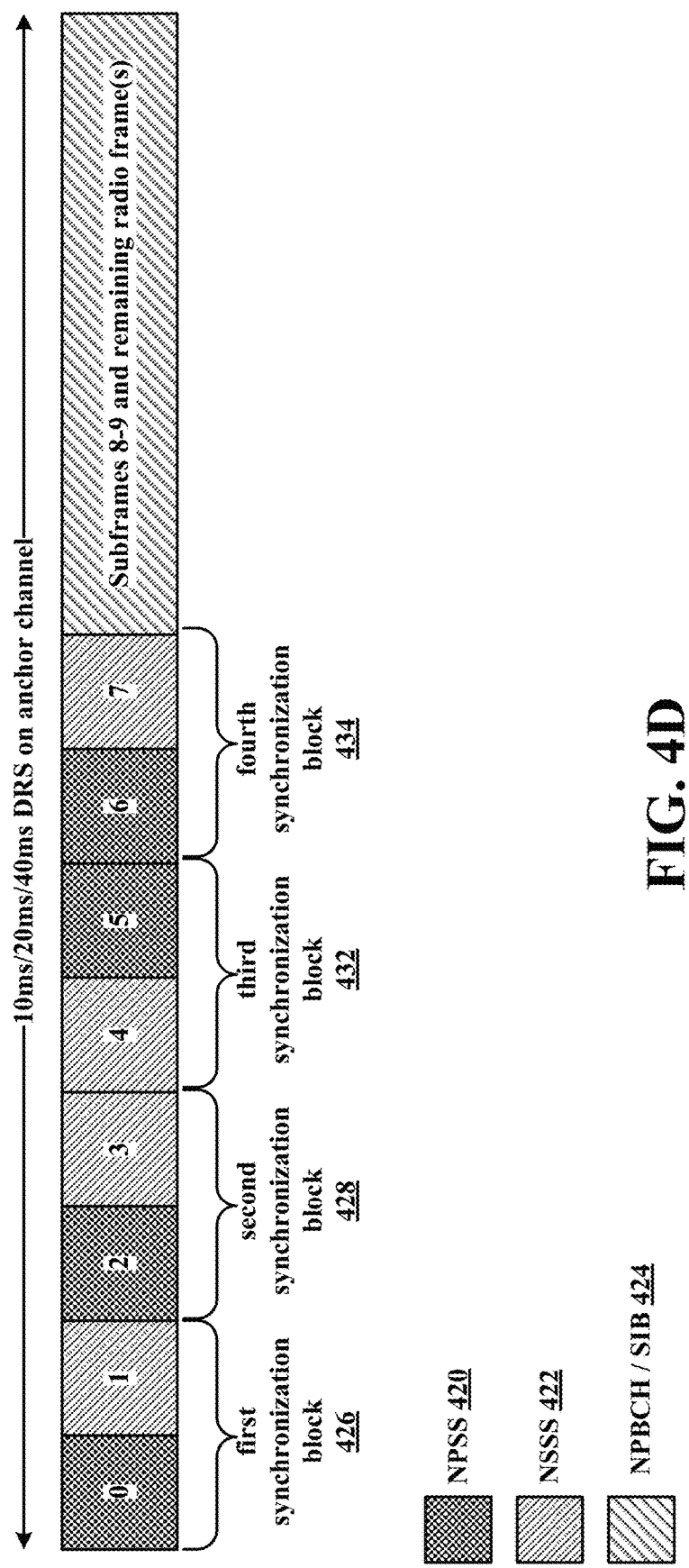
FIG. 4D illustrates a synchronization signal repetition pattern that may be used to transmit a plurality of synchronization signals in accordance with certain aspects of the disclosure.

FIG. 4D illustrates an anchor hopping frame 445 that includes a synchronization signal repetition pattern that may be used to transmit a plurality of synchronization signals on the anchor channel in accordance with certain aspects of the disclosure.

When the anchor hopping frame 445 includes a single radio frame (e.g., 10 subframes of 1 ms duration), the duration of the anchor hopping frame 445 may be 10 ms. When the anchor hopping frame 445 includes two radio frames (e.g., 20 subframes of 1 ms duration), the duration of the anchor hopping frame 445 may be 20 ms. When the anchor hopping frame 445 includes four radio frames (e.g., 40 subframes of 1 ms duration), the duration of the anchor hopping frame 445 may be 40 ms.

As illustrated in FIG. 4D, the synchronization signal repetition pattern may include a first order of the NPSS subframe and the NSSS subframe in a first synchronization block that is different than a second order of the NPSS subframe and the NSSS subframe in a second synchronization block that is contiguous with the first synchronization block. In certain aspects, one or more of the NPSS or the NSSS may occupy more than eleven OFDM symbols per subframe.

For example, the first synchronization block 426 includes NPSS 420 in subframe 0 (e.g., NPSS subframe) and NSSS 422 in subframe 1 (e.g., NSSS subframe). The second synchronization block 428 includes NPSS 420 in subframe 2 (e.g., NPSS subframe) and NSSS 422 in subframe 3 (e.g., NSSS subframe) The third synchronization block 432 includes NSSS 422 in subframe 4 (e.g., NSSS subframe) and NPSS 420 in subframe 5 (e.g., NPSS subframe). The fourth synchronization block 434 includes NPSS 420 in subframe 6 (e.g., NPSS subframe) and NSSS 422 in subframe 7 (e.g., NSSS subframe).

In the example illustrated in FIG. 4D, the order of the NPSS subframe and the NSSS subframe in the time domain in the second synchronization block 428 and the third synchronization block 432 is different. Similarly, the third synchronization block 432 and the fourth synchronization block 434 have a different order of the NPSS subframe and the NSSS subframe in the time domain.

By randomizing the transmission of NPSS (e.g., NPSS is not transmitted at a set interval of 2 ms), the occurrence of false peaks detected by the UE during timing estimation may be further reduced using the synchronization signal repetition pattern illustrated in FIG. 4D.

FIG. 4E is a table 460 illustrating different synchronization signal swapping patterns that may be used to transmit a plurality of synchronization signals in accordance with certain aspects of the disclosure.

The random swapping sequences are given in the table 460 with '0' at the i-th synchronization block (e.g., S-block) indicating no swapping of NPSS and NSSS and '1' indicating swapping of the i-th synchronization block. The particular swapping sequences depicted in FIG. 4E may yield the minimum magnitude of the largest false peak detected by the UE, and hence, synchronization delay be further reduced.

Figure 5:
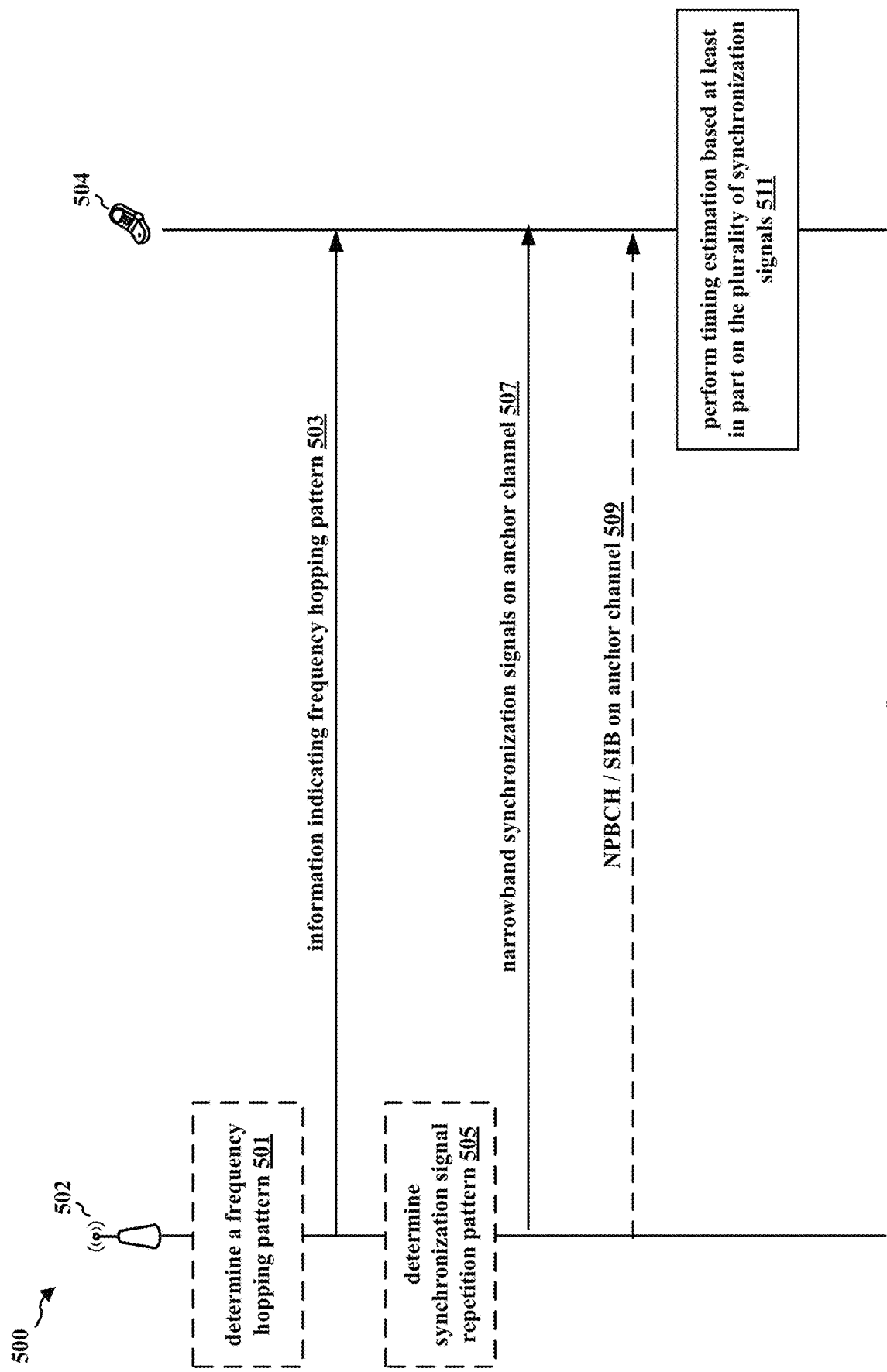
FIG. 5 illustrates a data flow that may be used to transmit a plurality of synchronization signals using a synchronization signal repetition pattern in accordance with certain aspects of the disclosure.

FIG. 5 illustrates a data flow 500 that may be used by a base station 502 and a UE 504 to transmit/receive a plurality of synchronization signals using a synchronization signal repetition pattern in accordance with certain aspects of the disclosure. Base station 502 may correspond to, e.g., base station 102, 180, 1050, eNB 310, apparatus 702/702'. UE 504 may correspond to, e.g., UE 104, 350, 750, the apparatus 1002/1002'. In addition, the base station 502 and the UE 504 may be configured to communicate using a frequency hopping pattern in the unlicensed frequency spectrum. For example, the base station 502 and UE 504 may be NB-IoT devices and/or eMTC devices. In FIG. 5, optional operations are indicated with dashed lines.

In certain configurations, the base station 502 may determine (at 501) a frequency hopping pattern for narrowband communications in the unlicensed frequency spectrum. For example, the base station 502 may determine a subset of the maximum number of narrowband channels within a wideband for frequency hopping (e.g., a frequency hopping pattern). The frequency hopping pattern may include one or more anchor hopping periods and one or more non-anchor hopping periods as described above in connection with FIG. 4A. In certain configurations, the base station 502 may be preconfigured with a frequency hopping pattern and operation 501 may be omitted.

In certain other configurations, the base station 502 may transmit (at 503) information indicating the narrowband frequency hopping pattern, and the information may be received by the UE 504. In certain aspects, the narrowband frequency hopping pattern may include an anchor channel and a plurality of non-anchor channels. In certain other aspects, the narrowband frequency hopping pattern may include a first hopping period associated with the anchor channel (e.g., anchor hopping periods 418*a*, 418*c*) and a second hopping period associated with a plurality of non-anchor channels (e.g., non-anchor hopping periods 418*b*, 418*d*).

In certain other configurations, the base station 502 may determine (at 505) a synchronization signal repetition pattern. For example, the base station 502 may determine to use one of the synchronization signal repetition patterns discussed above in connection with any of FIGS. 4B-4E. In certain configurations, the base station 502 may be preconfigured to use a certain synchronization signal repetition pattern and operation 505 may be omitted.

In certain other configurations, the base station 502 may transmit (at 507) a plurality of narrowband synchronization signals (e.g., NPSS/NSSS) using a synchronization signal repetition pattern during a first portion of the first hopping period on the anchor channel, and the UE 504 may receive the plurality of narrowband synchronization signals.

In certain aspects associated with the operation at 507, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. For example, referring to FIG. 4B, the synchronization signal repetition pattern may include a first set of NPSS 420 in a first set of contiguous subframes (e.g., subframes 0-4) and a second set of NSSS 422 in a second set of contiguous subframes (e.g., subframes 5-8).

In certain other aspects associated with the operation at 507, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. For example, referring to FIG. 4C, in the first synchronization block 426, the NPSS 420 may be located in subframe 0 (e.g., NPSS subframe) and the NSSS 422 may be located in subframe 1 (e.g., NSSS subframe). In the second synchronization block 428, the NPSS 420 may be located in subframe 2 (e.g., NPSS subframe) and the NSSS 422 may be located in subframe 3 (e.g., NSSS subframe). In the third synchronization block 432, the NPSS 420 may be located in subframe 4 (e.g., NPSS subframe) and the NSSS 422 may be located in subframe 5 (e.g., NSSS subframe). In the fourth synchronization block 434, the NPSS 420 may be located in subframe 6 (e.g., NPSS subframe) and the NSSS 422 may be located in subframe 7 (e.g., NSSS subframe).

In certain other aspects associated with the operation at 507, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain configurations (not depicted in FIG. 4C), the synchronization repetition pattern may include a greater number of NPSS 420 than NSSS 422. Here, adjacent NPSS subframes (e.g., subframe 8 in the first radio frame and subframe 0 in the subsequent radio frame) located after the plurality of synchronization blocks 426, 428, 432, 434 may be separated by an NPBCH subframe or an SIB-BR subframe.

In certain other aspects associated with the operation at 507, one or more of the NPSS or the NSSS may occupy more than eleven OFDM symbols per subframe. For example, referring to FIG. 4D, the first synchronization block 426 includes NPSS 420 in subframe 0 (e.g., NPSS subframe) and NSSS 422 in subframe 1 (e.g., NSSS subframe). The second synchronization block 428 includes NPSS 420 in subframe 2 (e.g., NPSS subframe) and NSSS 422 in subframe 3 (e.g., NSSS subframe) The third synchronization block 432 includes NSSS 422 in subframe 4 (e.g., NSSS subframe) and NPSS 420 in subframe 5 (e.g., NPSS subframe). The fourth synchronization block 434 includes NPSS 420 in subframe 6 (e.g., NPSS subframe) and NSSS 422 in subframe 7 (e.g., NSSS subframe). In the example illustrated in FIG. 4D, the order of the NPSS subframe and the NSSS subframe in the time domain in the second synchronization block 428 and the third synchronization block 432 is different. Similarly, the third synchronization block 432 and the fourth synchronization block 434 have a different order of the NPSS subframe and the NSSS subframe in the time domain.

In certain other configurations, the base station 502 may transmit (at 509) at least one of NPBCH or one or more SIBs in a second portion of the first hopping period on the anchor channel. For example, referring to FIGS. 4B, 4C, and 4D, the NPBCH/SIB-BR 424 may be transmitted in subframes 8 and 9 of the radio frame used to transmit the NPSS 420 and the NSSS 422. The NPBCH/SIB-BR 424 may also be transmitted in the subframes of one or more additional radio frames that occupy the anchor hopping frame 415, 430, 445.

In certain other configurations, the UE 504 may perform (at 511) timing estimation based at least in part on the plurality of synchronization signals received during the first portion of the first hopping period. For example, the UE 504 may search for the NPSS using a correlator that is matched to the Zadoff-Chu sequence of the NPSS. The timing and/or frequency of the system may be estimated by detecting the peak of the correlator matched output of the Zadoff-Chu sequence inside a timing hypothesis window.

Figure 6:
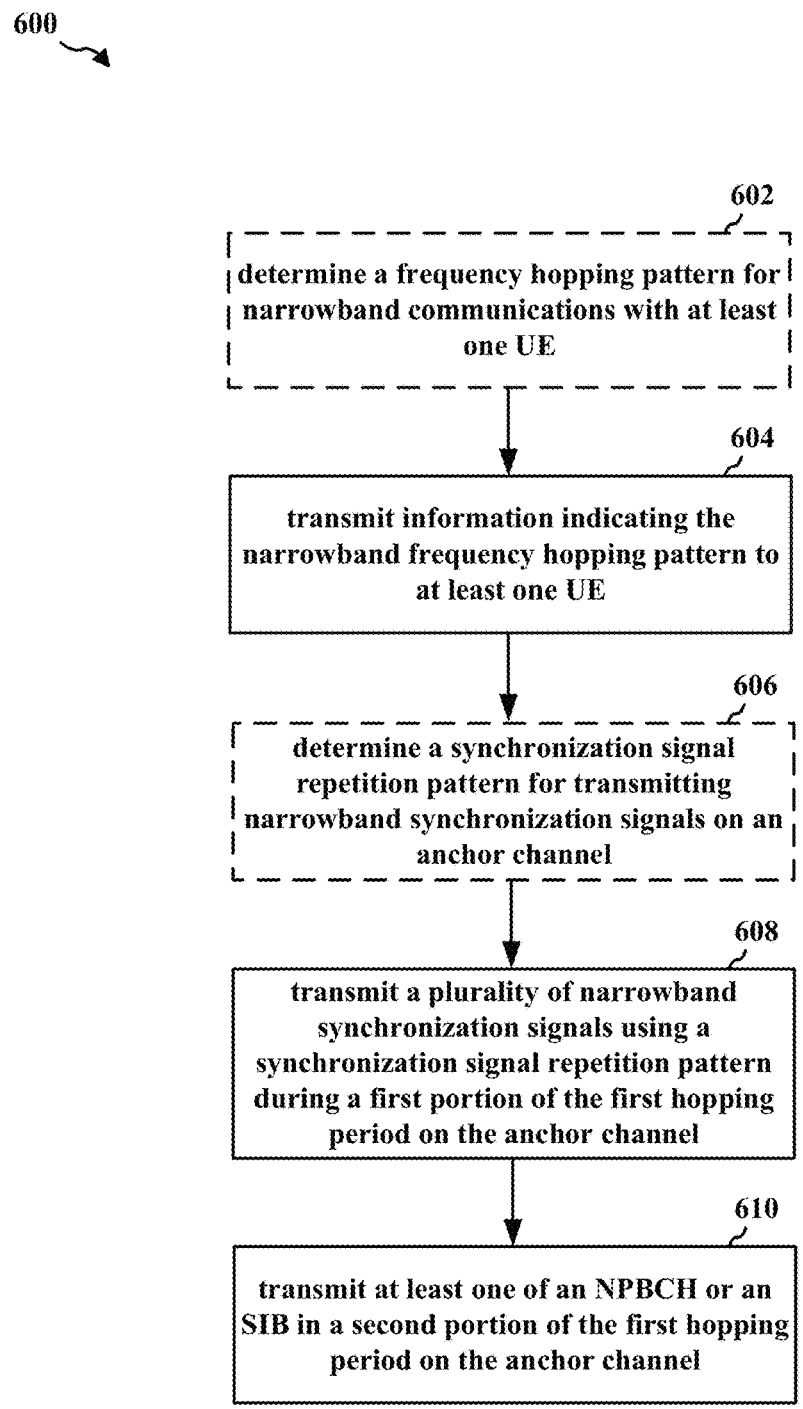
FIG. 6 is a flowchart of a method of wireless communication.

FIG. 6 is a flowchart 600 of a method of wireless communication. The method may be performed by a base station (e.g., base station 102, 180, 502, 1050, eNB 310, apparatus 702/702'). In FIG. 6, optional operations are indicated with dashed lines.

At 602, the base station may determine a frequency hopping pattern for narrowband communications in the unlicensed frequency spectrum. For example, referring to FIG. 5, the base station 502 may determine (at 501) a frequency hopping pattern for narrowband communications in the unlicensed frequency spectrum. For example, the base station 502 may determine a subset of the maximum number of narrowband channels within a wideband for frequency hopping (e.g., a frequency hopping pattern). The frequency hopping pattern may include one or more anchor hopping periods and one or more non-anchor hopping periods as described above in connection with FIG. 4A. In certain configurations, the base station may be preconfigured with a frequency hopping pattern and operation 602 may be omitted.

At 604, the base station may transmit information indicating a narrowband frequency hopping pattern to at least one UE. In certain aspects, the narrowband frequency hopping pattern may include an anchor channel and a plurality of non-anchor channels. In certain other aspects, the narrowband frequency hopping pattern may include a first hopping period associated with the anchor channel (e.g., anchor hopping periods 418a, 418c in FIG. 4A) and a second hopping period associated with a plurality of non-anchor channels (e.g., non-anchor hopping periods 418b, 418d in FIG. 4A). For example, referring to FIG. 5, the base station 502 may transmit (at 503) information indicating the narrowband frequency hopping pattern.

At 606, the base station may determine a synchronization signal repetition pattern. For example, referring to FIG. 5, the base station 502 may determine (at 505) a synchronization signal repetition pattern. The base station 502 may determine to use one of the synchronization signal repetition patterns discussed above in connection with any of FIGS. 4B-4E. In certain configurations, the base station may be preconfigured to use a certain synchronization signal repetition pattern and operation 602 may be omitted.

At 608, the base station may transmit a plurality of narrowband synchronization signals using a synchronization signal repetition pattern during a first portion of the first hopping period on the anchor channel. For example, referring to FIG. 5, the base station 502 may transmit (at 507) a plurality of narrowband synchronization signals (e.g., NPSS/NSSS) using a synchronization signal repetition pattern during a first portion of the first hopping period on the anchor channel, and the UE 504 may receive the plurality of narrowband synchronization signals.

In certain aspects associated with the operation at 608, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. For example, referring to FIG. 4B, the synchronization signal repetition pattern may include a first set of NPSS 420 in a first set of contiguous subframes (e.g., subframes 0-4) and a second set of NSSS 422 in a second set of contiguous subframes (e.g., subframes 5-8).

In certain other aspects associated with the operation at 608, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. For example, referring to FIG. 4C, in the first synchronization block 426, the NPSS 420 may be located in subframe 0 (e.g., NPSS subframe) and the NSSS 422 may be located in subframe 1 (e.g., NSSS subframe). In the second synchronization block 428, the NPSS 420 may be located in subframe 2 (e.g., NPSS subframe) and the NSSS 422 may be located in subframe 3 (e.g., NSSS subframe). In the third synchronization block 432, the NPSS 420 may be located in subframe 4 (e.g., NPSS subframe) and the NSSS 422 may be located in subframe 5 (e.g., NSSS subframe). In the fourth synchronization block 434, the NPSS 420 may be located in subframe 6 (e.g., NPSS subframe) and the NSSS 422 may be located in subframe 7 (e.g., NSSS subframe).

In certain other aspects associated with the operation at 608, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain configurations (not depicted in FIG. 4C), the synchronization repetition pattern may include a greater number of NPSS 420 than NSSS 422. Here, adjacent NPSS subframes (e.g., subframe 8 in the first radio frame and subframe 0 in the subsequent radio frame) located after the plurality of synchronization blocks 426, 428, 432, 434 may be separated by an NPBCH subframe or an SIB-BR subframe.

In certain other aspects associated with the operation at 608, one or more of the NPSS or the NSSS may occupy more than eleven OFDM symbols per subframe. For example, referring to FIG. 4D, the first synchronization block 426 includes NPSS 420 in subframe 0 (e.g., NPSS subframe) and NSSS 422 in subframe 1 (e.g., NSSS subframe). The second synchronization block 428 includes NPSS 420 in subframe 2 (e.g., NPSS subframe) and NSSS 422 in subframe 3 (e.g., NSSS subframe) The third synchronization block 432 includes NSSS 422 in subframe 4 (e.g., NSSS subframe) and NPSS 420 in subframe 5 (e.g., NPSS subframe). The fourth synchronization block 434 includes NPSS 420 in subframe 6 (e.g., NPSS subframe) and NSSS 422 in subframe 7 (e.g., NSSS subframe). In the example illustrated in FIG. 4D, the order of the NPSS subframe and the NSSS subframe in the time domain in the second synchronization block 428 and the third synchronization block 432 is different. Similarly, the third synchronization block 432 and the fourth synchronization block 434 have a different order of the NPSS subframe and the NSSS subframe in the time domain.

At 610, the base station may transmit at least one of an NPBCH or SIBs in a second portion of the first hopping period on the anchor channel. For example, referring to FIG. 5, the base station 502 may transmit (at 509) at least one of NPBCH or one or more SIBs in a second portion of the first hopping period on the anchor channel. Referring to FIGS. 4B, 4C, and 4D, the NPBCH/SIB-BR 424 may be transmitted in subframes 8 and 9 of the radio frame used to transmit the NPSS 420 and the NSSS 422. The NPBCH/SIB-BR 424 may also be transmitted in the subframes of one or more additional radio frames that occupy the anchor hopping frame 415, 430, 445.

Figure 7:
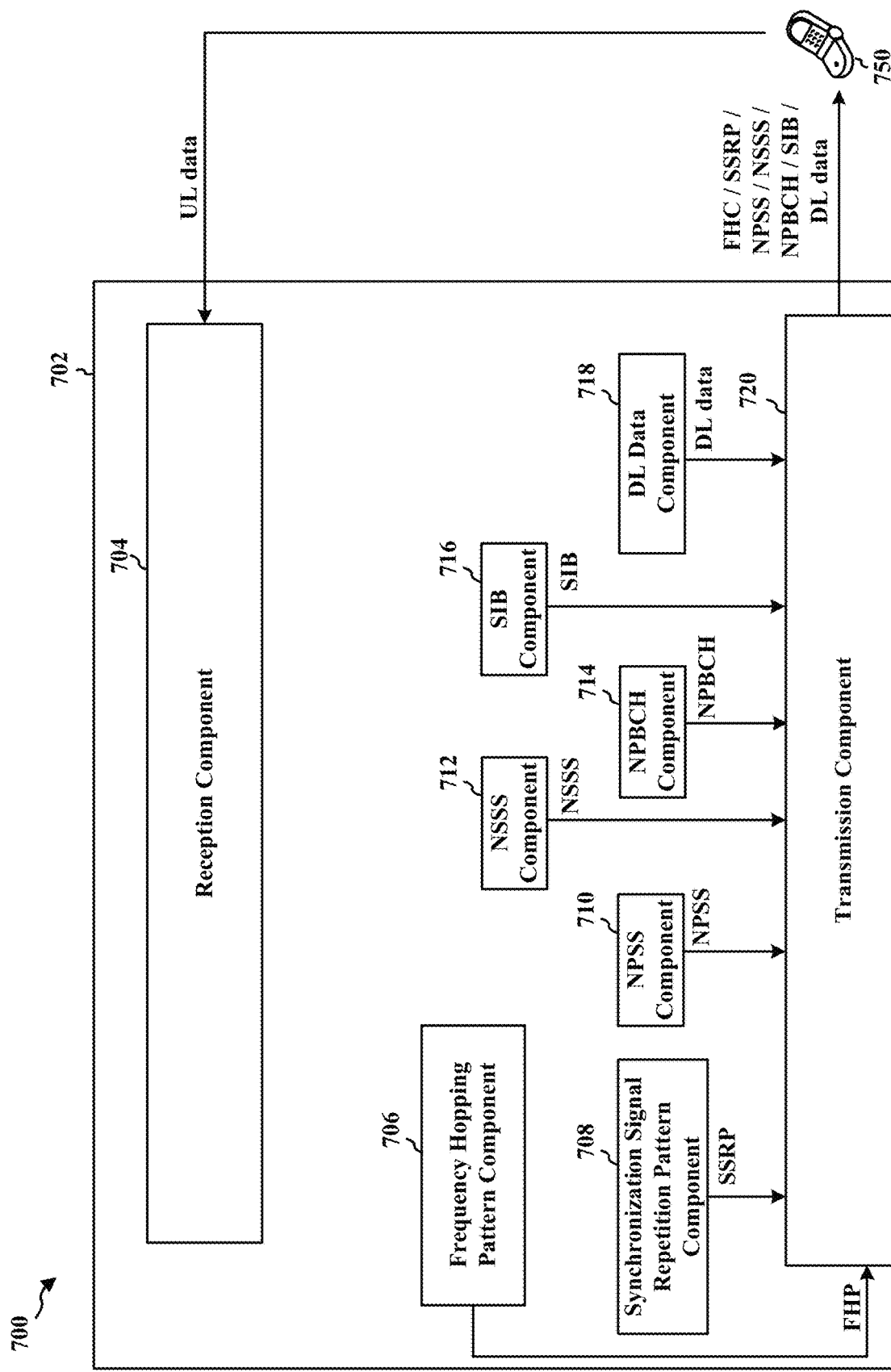
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a base station (e.g., base station 102, 180, 502, 1050, eNB 310, apparatus 702') in communication with a UE 750 (e.g., UE 104, 350, 504, the apparatus 1002/1002'). The apparatus may include a reception component 704, a frequency hopping pattern (FHP) component 706, a synchronization signal repetition pattern (SSRP) component 708, an NPSS component 710, an NSSS component 712, an NPBCH component 714, an SIB component 716, a DL data component 718, and a transmission component 720.

In certain configurations, the FHP component 706 may be configured to determine a frequency hopping pattern for narrowband communications in the unlicensed frequency spectrum. In certain aspects, the narrowband frequency hopping pattern may include an anchor channel and a plurality of non-anchor channels. The FHP component 706 may be configured to send a signal associated with the FHP to the transmission component 720. The transmission component 720 may be configured to send a signal associated with the FHP to the UE 750.

In certain configurations, the SSRP component 708 may be configured to determine a SSRP. The SSRP component 708 may be configured to transmit information associated with the SSRP to the UE 750.

In certain configurations, the NPSS component 710 may be configured to generate one or more NPSS. The NPSS component 710 may be configured to send the one or more NPSS to the transmission component 720. In certain configurations, the NSSS component 712 may be configured to generate one or more NSSS. The NSSS component 712 may be configured to send the one or more NSSS to the transmission component 720. In certain configurations, the NPBCH component 714 may be configured to generate one or more NPBCH transmissions. The NPBCH component 714 may be configured to send the one or more NPBCH transmissions to the transmission component 720. The DL data component 718 may be configured to generate one or more DL data transmissions. The DL data component 718 may be configured to send the one or more DL data transmissions to the transmission component 720.

In certain configurations, the transmission component 720 may be configured to transmit a plurality of narrowband synchronization signals (e.g., NPSS/NSSS) using a synchronization signal repetition pattern during a first portion of the first hopping period on the anchor channel. In certain aspects, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. In certain other aspects, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. In certain other aspects, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain other aspects, one or more of the NPSS or the NSSS may occupy more than eleven OFDM symbols per subframe.

In certain other aspects, the transmission component may be configured to transmit at least one of an NPBCH or SIBs in a second portion of the first hopping period on the anchor channel.

In certain other configurations, the reception component 704 may be configured to receive one or more UL data transmissions from the UE 750 on the non-anchor hopping channels.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
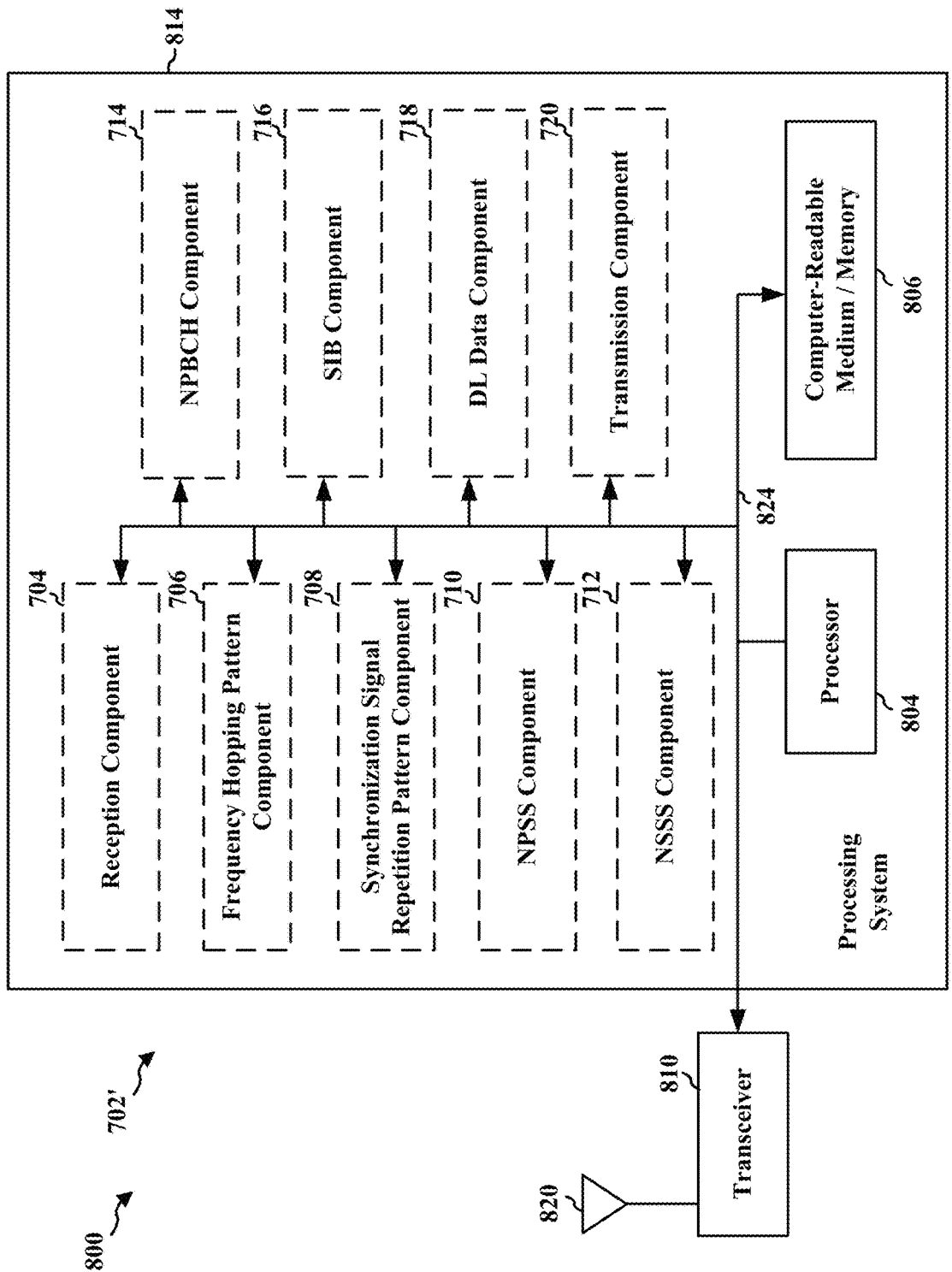
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 720, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375.

In certain configurations, the apparatus 702/702' for wireless communication may include means for determining a frequency hopping pattern for narrowband communications in the unlicensed frequency spectrum. In certain other configurations, the apparatus 702/702' for wireless communication may include means for transmit information indicating a narrowband frequency hopping pattern to at least one UE. In certain aspects, the narrowband frequency hopping pattern may include an anchor channel and a plurality of non-anchor channels. In certain other aspects, the narrowband frequency hopping pattern may include a first hopping period associated with the anchor channel and a second hopping period associated with a plurality of non-anchor channels. In certain other configurations, the apparatus 702/702' for wireless communication may include means for determining a synchronization signal repetition pattern. In certain other configurations, the apparatus 702/702' for wireless communication may include means for transmitting a plurality of narrowband synchronization signals (e.g., NPSS/NSSS) using a synchronization signal repetition pattern during a first portion of the first hopping period on the anchor channel. In certain aspects, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. In certain other aspects, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. In certain other aspects, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain other aspects, one or more of the NPSS or the NSSS may occupy more than eleven OFDM symbols per subframe. In certain other configurations, the apparatus 702/702' for wireless communication may include means for transmitting at least one of an NPBCH or SIBs in a second portion of the first hopping period on the anchor channel. The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
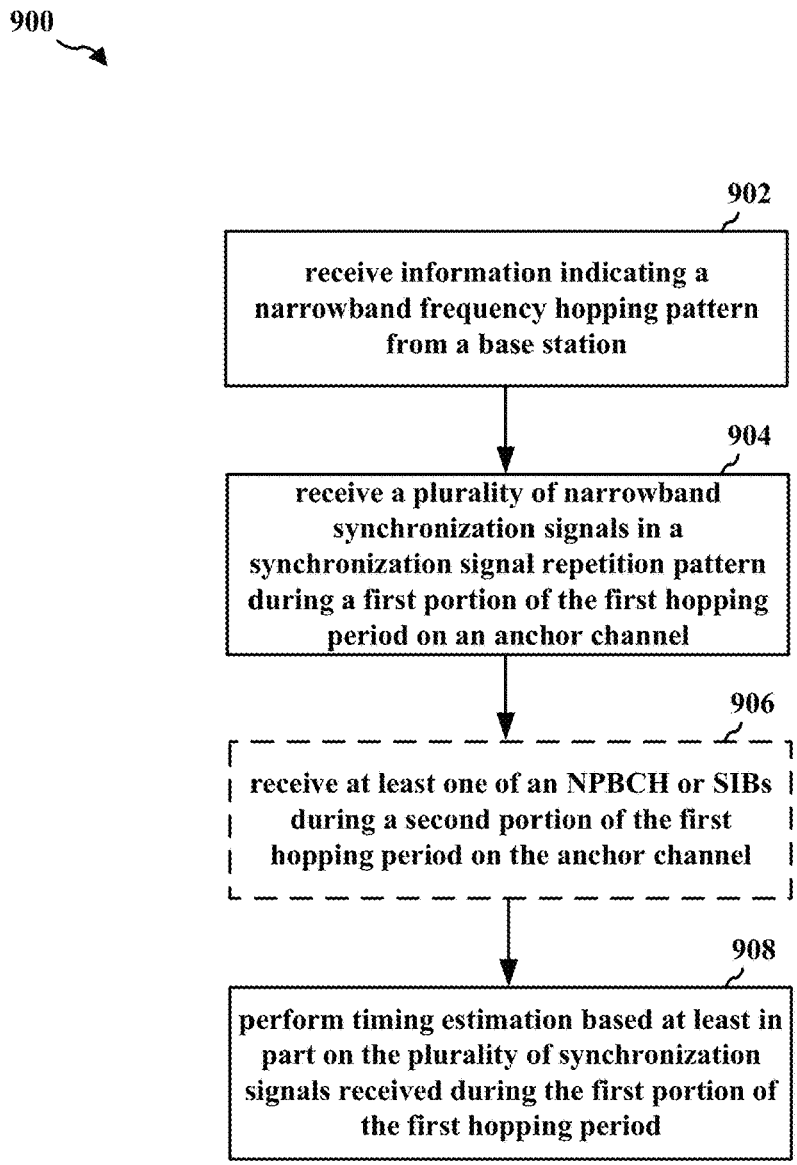
FIG. 9 is a flowchart of a method of wireless communication.

FIG. 9 is a flowchart 900 of a method of wireless communication. The method may be performed by a UE (e.g., UE 104, 350, 504, 750, apparatus 1002/1002'). In FIG. 9, optional operations are indicated with dashed lines.

At 902, the UE may receive information associated with a narrowband frequency hopping pattern from a base station. In certain aspects, the narrowband frequency hopping pattern may include an anchor channel and a plurality of non-anchor channels. In certain other aspects, the narrowband frequency hopping pattern may include a first hopping period associated with the anchor channel (e.g., anchor hopping periods 418a, 418c in FIG. 4A) and a second hopping period associated with a plurality of non-anchor channels (e.g., non-anchor hopping periods 418b, 418d in FIG. 4A). For example, referring to FIG. 5, the base station 502 may transmit (at 503) information indicating the narrowband frequency hopping pattern that is received by the UE 504.

At 904, the UE may receive a plurality of narrowband synchronization signals using a synchronization signal repetition pattern during a first portion of the first hopping period on the anchor channel. For example, referring to FIG. 5, the base station 502 may transmit (at 507) a plurality of narrowband synchronization signals (e.g., NPSS/NSSS) using a synchronization signal repetition pattern during a first portion of the first hopping period on the anchor channel, and the UE 504 may receive the plurality of narrowband synchronization signals.

In certain aspects associated with the operation at 904, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. For example, referring to FIG. 4B, the synchronization signal repetition pattern may include a first set of NPSS 420 in a first set of contiguous subframes (e.g., subframes 0-4) and a second set of NSSS 422 in a second set of contiguous subframes (e.g., subframes 5-8).

In certain other aspects associated with the operation at 904, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. For example, referring to FIG. 4C, in the first synchronization block 426, the NPSS 420 may be located in subframe 0 (e.g., NPSS subframe) and the NSSS 422 may be located in subframe 1 (e.g., NSSS subframe). In the second synchronization block 428, the NPSS 420 may be located in subframe 2 (e.g., NPSS subframe) and the NSSS 422 may be located in subframe 3 (e.g., NSSS subframe). In the third synchronization block 432, the NPSS 420 may be located in subframe 4 (e.g., NPSS subframe) and the NSSS 422 may be located in subframe 5 (e.g., NSSS subframe). In the fourth synchronization block 434, the NPSS 420 may be located in subframe 6 (e.g., NPSS subframe) and the NSSS 422 may be located in subframe 7 (e.g., NSSS subframe).

In certain other aspects associated with the operation at 904, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain configurations (not depicted in FIG. 4C), the synchronization repetition pattern may include a greater number of NPSS 420 than NSSS 422. Here, adjacent NPSS subframes (e.g., subframe 8 in the first radio frame and subframe 0 in the subsequent radio frame) located after the plurality of synchronization blocks 426, 428, 432, 434 may be separated by an NPBCH subframe or an SIB-BR subframe.

In certain other aspects associated with the operation at 904, one or more of the NPSS or the NSSS may occupy more than eleven OFDM symbols per subframe. For example, referring to FIG. 4D, the first synchronization block 426 includes NPSS 420 in subframe 0 (e.g., NPSS subframe) and NSSS 422 in subframe 1 (e.g., NSSS subframe). The second synchronization block 428 includes NPSS 420 in subframe 2 (e.g., NPSS subframe) and NSSS 422 in subframe 3 (e.g., NSSS subframe) The third synchronization block 432 includes NSSS 422 in subframe 4 (e.g., NSSS subframe) and NPSS 420 in subframe 5 (e.g., NPSS subframe). The fourth synchronization block 434 includes NPSS 420 in subframe 6 (e.g., NPSS subframe) and NSSS 422 in subframe 7 (e.g., NSSS subframe). In the example illustrated in FIG. 4D, the order of the NPSS subframe and the NSSS subframe in the time domain in the second synchronization block 428 and the third synchronization block 432 is different. Similarly, the third synchronization block 432 and the fourth synchronization block 434 have a different order of the NPSS subframe and the NSSS subframe in the time domain.

At 906, the UE may receive at least one of an NPBCH or SIBs in a second portion of the first hopping period on the anchor channel. For example, referring to FIG. 5, the base station 502 may transmit (at 509) at least one of NPBCH or one or more SIBs in a second portion of the first hopping period on the anchor channel that are received by the UE 504. Referring to FIGS. 4B, 4C, and 4D, the NPBCH/SIB-BR 424 may be transmitted in subframes 8 and 9 of the radio frame used to transmit the NPSS 420 and the NSSS 422. The NPBCH/SIB-BR 424 may also be transmitted in the subframes of one or more additional radio frames that occupy the anchor hopping frame 415, 430, 445.

At 908, the UE may perform timing estimation based at least in part on the plurality of synchronization signals received during the first portion of the first hopping period. For example, referring to FIG. 5, the UE 504 may perform (at 511) timing estimation based at least in part on the plurality of synchronization signals received during the first portion of the first hopping period. For example, the UE 504 may search for the NPSS using a correlator that is matched to the Zadoff-Chu sequence of the NPSS. The timing and/or frequency of the system may be estimated by detecting the peak of the correlator matched output of the Zadoff-Chu sequence inside a timing hypothesis window.

Figure 10:
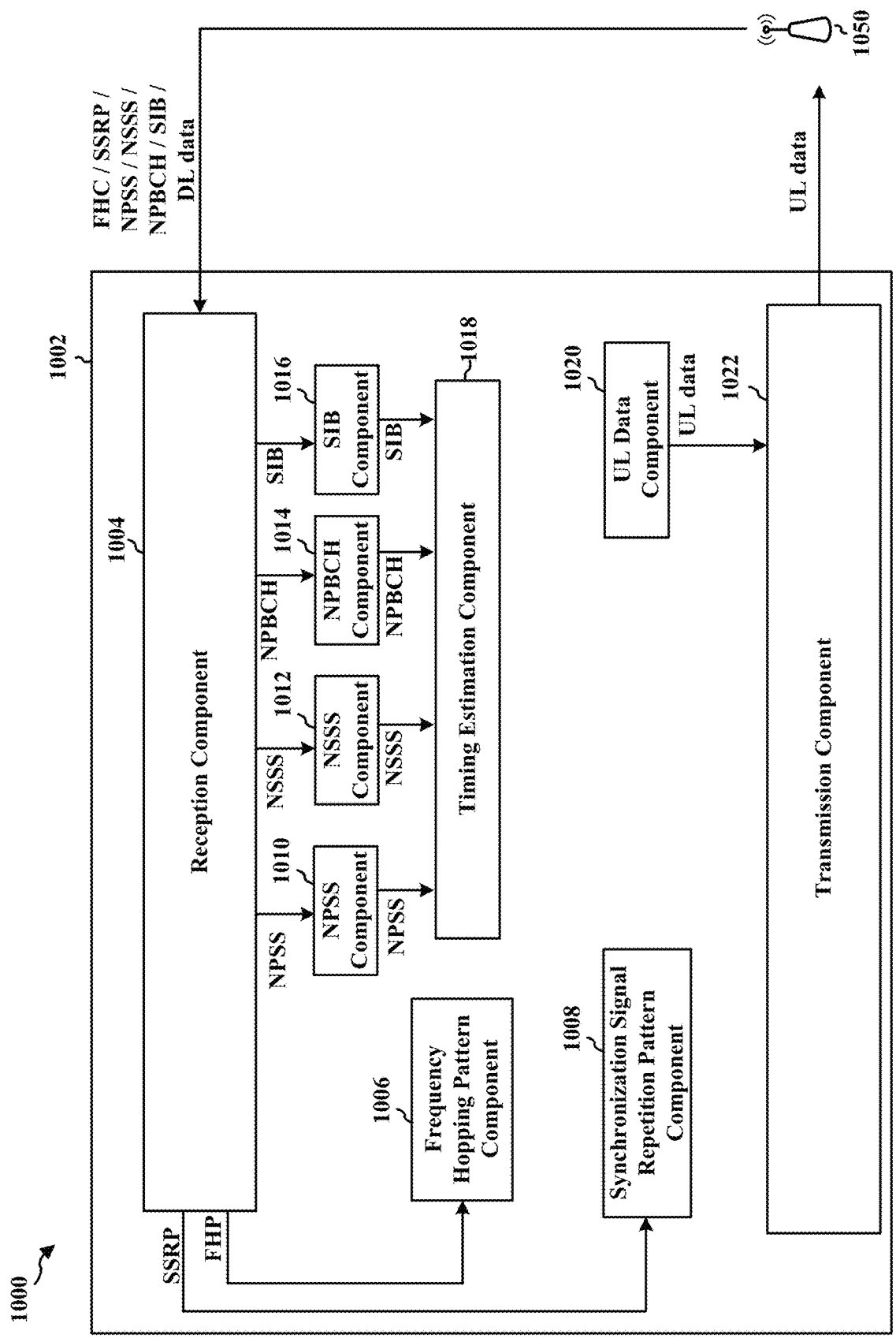
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 504, 750, the apparatus 1002') in communication with a base station 1050 (e.g., base station 102, 180, 502, 1050, eNB 310, apparatus 702/702'). The apparatus may include a reception component 1004, a FHP component 1006, a SSRP component 1008, an NPSS component 1010, an NSSS component 1012, an NPBCH component 1014, an SIB component 1016, a timing estimation component 1018, a UL data component 1020, and a transmission component 1022.

In certain configurations, the reception component 1004 may be configured to receive information associated with a FHP from the base station 1050. In certain aspects, the narrowband frequency hopping pattern may include an anchor channel and a plurality of non-anchor channels. The reception component 1004 may be configured to send a signal associated with the FHP to the FHP component 1006. In certain other configurations, the reception component 1004 may be configured to receive information associated with an SSRP from the base station 1050. The reception component 1004 may be configured to send a signal associated with the SSRP to the SSRP component 1008.

In certain configurations, the reception component 1004 may be configured to receive a plurality of narrowband synchronization signals (e.g., NPSS/NSSS) using a synchronization signal repetition pattern during a first portion of the first hopping period on the anchor channel. In certain aspects, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. In certain other aspects, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. In certain other aspects, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain other aspects, one or more of the NPSS or the NSSS may occupy more than eleven OFDM symbols per subframe. The reception component 1004 may be configured to send the NPSS to the NPSS component 1010 and the NSSS to the NSSS component 1012.

In certain other configurations, the reception component may be configured to receive at least one of an NPBCH or SIBs in a second portion of the first hopping period on the anchor channel. The reception component 1004 may be configured to send the NPBCH transmissions to the NPBCH component 1014 and the SIBs to the SIB component 1016. The NPSS component 1010 may be configured to send the NPSS to the timing estimation component 1018. The NSSS component 1012 may be configured to send the NSSS to the timing estimation component 1018. The NPBCH component 1014 may be configured to send the NPBCH to the timing estimation component 1018. The SIB component 1016 may be configured to send the SIB to the timing estimation component 1018.

In certain configurations, the timing estimation component 1018 may be configured to perform timing estimation based at least in part on the plurality of synchronization signals received during the first portion of the first hopping period.

In certain other configurations, the UL data component 1020 may be configured to generate one or more UL data transmissions which are sent to the transmission component 1022. The transmission component 1022 may be configured to send the one or more UL data transmissions to the base station 1050.

Figure 11:
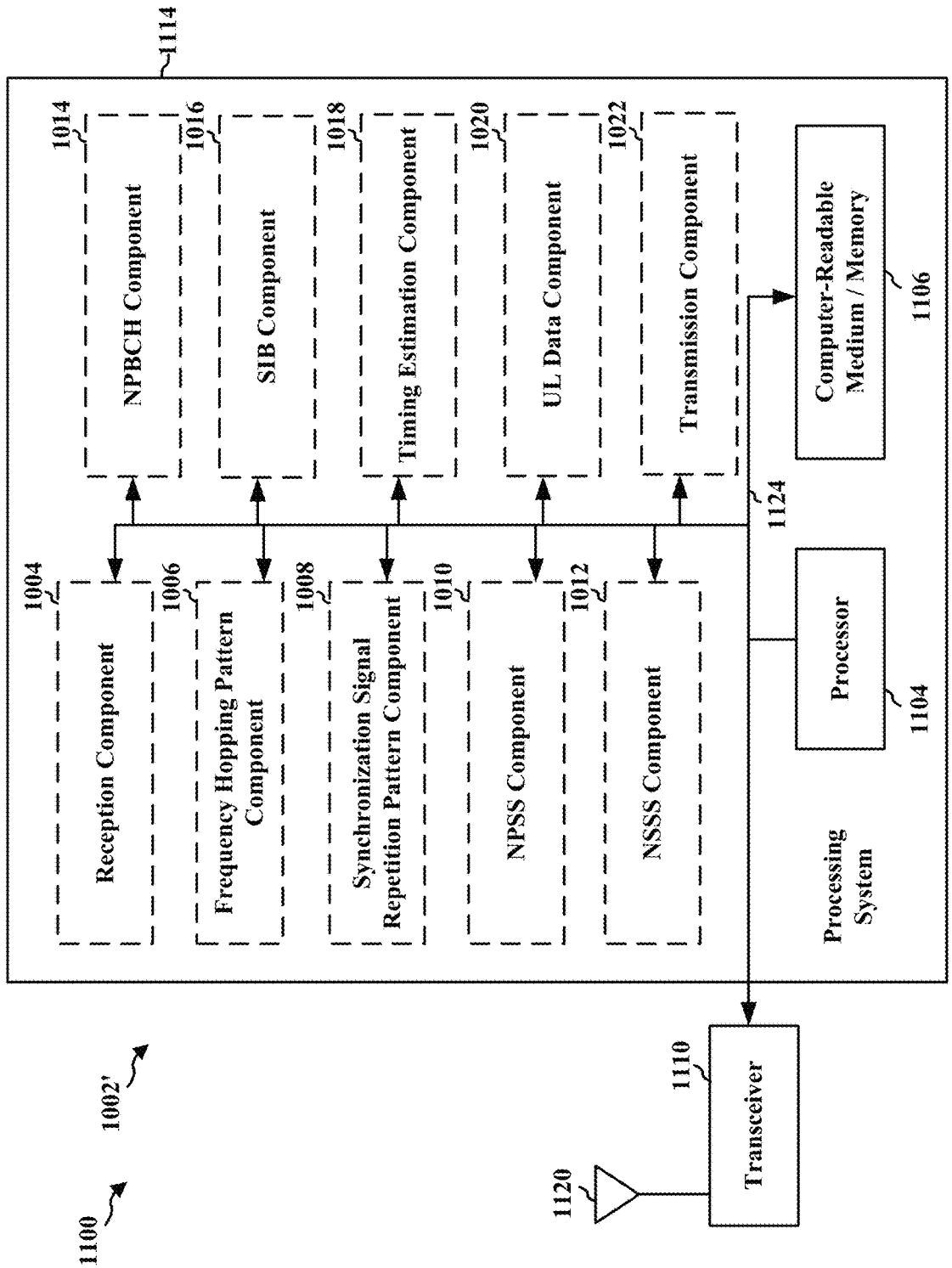
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1022, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In certain configurations, the apparatus 1002/1002' for wireless communication may include means for receiving information associated with a narrowband frequency hopping pattern from a base station. In certain aspects, the narrowband frequency hopping pattern may include an anchor channel and a plurality of non-anchor channels. In certain other aspects, the narrowband frequency hopping pattern may include a first hopping period associated with the anchor channel and a second hopping period associated with a plurality of non-anchor channels. In certain other configurations, the apparatus 1002/1002' for wireless communication may include means for receiving a plurality of narrowband synchronization signals using a synchronization signal repetition pattern during a first portion of the first hopping period on the anchor channel. In certain configurations, the apparatus 1002/1002' for wireless communication may include means for receiving a plurality of narrowband synchronization signals (e.g., NPSS/NSSS) using a synchronization signal repetition pattern during a first portion of the first hopping period on the anchor channel. In certain aspects, the synchronization signal repetition pattern may include a first set of NPSS in a first set of contiguous subframes on the anchor channel and a second set of NSSS in a second set of contiguous subframes on the anchor channel. In certain other aspects, the second set of contiguous subframes may be located after the first set of contiguous subframes in a time domain. In certain other aspects, the synchronization signal repetition pattern may include a plurality of contiguous synchronization blocks. In certain other aspects, each of the plurality of contiguous synchronization blocks includes an NPSS located in an NPSS subframe and an NSSS located in an NSSS subframe that is contiguous with the NPSS subframe, and the NSSS subframe may be located after the NPSS subframe in a time domain. In certain other aspects, the synchronization repetition pattern may include a greater number of NPSS than NSSS. In certain other aspects, adjacent NPSS subframes located after the plurality of synchronization blocks in the first hopping period are separated by an NPBCH subframe or a SIB subframe. In certain other aspects, one or more of the NPSS or the NSSS may occupy more than eleven OFDM symbols per subframe. In certain other configurations, the apparatus 1002/1002' for wireless communication may include means for performing timing estimation based at least in part on the plurality of synchronization signals received during the first portion of the first hopping period.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a base station, the method comprising:
    transmitting information indicating a narrowband frequency hopping pattern to a least one user equipment (UE), the narrowband frequency hopping pattern including an anchor channel and a plurality of non-anchor channels, the narrowband frequency hopping pattern further including a first hopping period associated with the anchor channel and a second hopping period associated with the plurality of non-anchor channels; and
    transmitting a plurality of narrowband synchronization signals using a synchronization signal repetition pattern during a first portion of the first hopping period on the anchor channel.

2. The method of claim 1, further comprising:
    transmitting at least one of a narrowband physical broadcast channel (NPBCH) or system information blocks (SIBs) in a second portion of the first hopping period on the anchor channel.

3. The method of claim 1, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

4. The method of claim 3, wherein the second set of contiguous subframes is located after the first set of contiguous subframes in a time domain.

5. The method of claim 1, wherein:
    the synchronization signal repetition pattern includes a plurality of contiguous synchronization blocks; and
    each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

6. The method of claim 5, wherein the NSSS subframe is located after the NPSS subframe in a time domain.

7. The method of claim 5, wherein:
    the synchronization signal repetition pattern includes a greater number of NPSS than NSSS; and
    adjacent NPSS subframes located after the plurality of contiguous synchronization blocks in the first hopping period are separated by a narrowband physical broadcast channel (NPBCH) subframe or a system information block (SIB) subframe.

8. The method of claim 5, wherein one or more of the NPSS or the NSSS occupy more than eleven orthogonal frequency-division multiplexing (OFDM) symbols per subframe.

9. A method of wireless communication for a user equipment (UE), the method comprising:
    receiving information indicating a narrowband frequency hopping pattern from a base station, the narrowband frequency hopping pattern including an anchor channel and a plurality of non-anchor channels, the narrowband frequency hopping pattern further including first hopping period associated with the anchor channel and a second hopping period associated with a plurality of non-anchor channels;
    receiving a plurality of narrowband synchronization signals in a synchronization signal repetition pattern during a first portion of the first hopping period on the anchor channel; and
    performing timing estimation based at least in part on the plurality of narrowband synchronization signals received during the first portion of the first hopping period.

10. The method of claim 9, further comprising:
    receiving at least one of a narrowband physical broadcast channel (NPBCH) or system information blocks (SIBs) during a second portion of the first hopping period on the anchor channel.

11. The method of claim 9, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

12. The method of claim 11, wherein the second set of contiguous subframes is located after the first set of contiguous sublimes in a time domain.

13. The method of claim 9, wherein:
    the synchronization signal repetition pattern includes a plurality of contiguous synchronization blocks; and
    each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

14. The method of claim 13, wherein the NSSS subframe is located after the NPSS subframe in a time domain.

15. The method of claim 13, wherein:
    the synchronization signal repetition pattern includes a greater number of NPSS than NSSS; and
    adjacent NPSS subframes located after the plurality of contiguous synchronization blocks in the first hopping period are separated by a narrowband physical broadcast channel (NPBCH) subframe or a system information block (SIB) subframe.

16. The method of claim 13, wherein one or more of the NPSS or the NSSS occupy more than eleven orthogonal frequency-division multiplexing (OFDM) symbols per subframe.

17. An apparatus for wireless communication for a base station, the apparatus comprising:
   means for transmitting information indicating a narrowband frequency hopping pattern to at least one user equipment (UE), the narrowband frequency hopping pattern including an anchor channel and a plurality of non-anchor channels, the narrowband frequency hopping pattern further including a first hopping period associated with the anchor channel and a second hopping period associated with the plurality of non-anchor channels; and
   means for transmitting a plurality of narrowband synchronization signals using a synchronization signal repetition pattern during a first portion of the first hopping period on the anchor channel.

18. The apparatus of claim 17, further comprising:
   means for transmitting at least one of a narrowband physical broadcast channel (NPBCH) or system information blocks (SIBs) in a second portion of the first hopping period on the anchor channel.

19. The apparatus of claim 17, wherein the synchronization signal repetition pattern includes a first set of narrowband primary synchronization signals (NPSS) in a first set of contiguous subframes on the anchor channel and a second set of narrowband secondary synchronization signals (NSSS) in a second set of contiguous subframes on the anchor channel.

20. The apparatus of claim 19, wherein the second set of contiguous subframes is located after the first set of contiguous subframes in a time domain.

21. The apparatus of claim 17, wherein:
   the synchronization signal repetition pattern includes a plurality of contiguous synchronization blocks; and
   each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

22. The apparatus of claim 21, wherein the NSSS subframe is located after the NPSS subframe in a time domain.

23. The apparatus of claim 21, wherein:
   the synchronization signal repetition pattern includes a greater number of NPSS than NSSS; and
   adjacent NPSS subframes located after the plurality of contiguous synchronization blocks in the first hopping period are separated by a narrowband physical broadcast channel (NPBCH) subframe or a system information block (SIB) subframe.

24. The apparatus of claim 21, wherein one or more of the NPSS or the NSSS occupy more than eleven orthogonal frequency-division multiplexing (OFDM) symbols per subframe.

25. An apparatus for wireless communication for a user equipment (UE), the apparatus comprising:
   means for receiving information indicating a narrowband frequency hopping pattern from a base station, the narrowband frequency hopping pattern including an anchor channel and a plurality of non-anchor channels, the narrowband frequency hopping pattern further including a first hopping period associated with the anchor channel and a second hopping period associated with the plurality of non-anchor channels;
   means for receiving a plurality of narrowband synchronization signals in a synchronization signal repetition pattern during a first portion of the first hopping period on the anchor channel; and
   means for performing timing estimation based at least in part on the plurality of narrowband synchronization signals received during the first portion of the first hopping period.

26. The apparatus of claim 25, further comprising:
   means for receiving at least one of a narrowband physical broadcast channel (NPBCH) or system information blocks (SIBs) during a second portion of the first hopping period on the anchor channel.

27. The apparatus of claim 25, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

28. The apparatus of claim 27, wherein the second set of contiguous subframes is located after the first set of contiguous subframes in a time domain.

29. The apparatus of claim 25, wherein:
   the synchronization signal repetition pattern includes a plurality of contiguous synchronization blocks; and
   each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

30. The apparatus of claim 29, wherein the NSSS subframe is located after the NPSS subframe in a time domain.

31. The apparatus of claim 29, wherein:
   the synchronization signal repetition pattern includes a greater number of NPSS than NSSS; and
   adjacent NPSS subframes located after the plurality of contiguous synchronization blocks in the first hopping period are separated by a narrowband physical broadcast channel (NPBCH) subframe or a system information block (SIB) subframe.

32. The apparatus of claim 29, wherein one or more of the NPSS or the NSSS occupy more than eleven orthogonal frequency-division multiplexing (OFDM) symbols per subframe.

33. An apparatus for wireless communication for a base station, the apparatus comprising:
   a memory; and
   at least one processor coupled to the memory and configured to:
      transmit information indicating a narrowband frequency hopping pattern to at least one user equipment (UE), the narrowband frequency hopping pattern including an anchor channel and a plurality of non-anchor channels, the narrowband frequency hopping pattern further including a first hopping period associated with the anchor channel and a second hopping period associated with Rail the plurality of non-anchor channels; and
      transmit a plurality of narrowband synchronization signals using a synchronization signal repetition pattern during a first portion of the first hopping period on the anchor channel.

34. The apparatus of claim 33, Wherein the at least one processor is further configured to:
  transmit at least one of a narrowband physical broadcast channel (NPBCH) or system information blocks (SIBs) in a second portion of the first hopping period on the anchor channel.

35. The apparatus of claim 33, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

36. The apparatus of claim 35, wherein the second set of contiguous subframes is located after the first set of contiguous subframes m a time domain.

37. The apparatus of claim 33, wherein:
  the synchronization signal repetition pattern includes a plurality of contiguous synchronization blocks; and
  each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

38. The apparatus of claim 37, wherein the NSSS subframe is located after the NPSS subframe in a time domain.

39. The apparatus of claim 37, wherein:
  the synchronization signal repetition pattern includes a greater number of NPSS than NSSS; and
  adjacent NPSS subframes located after the plurality of contiguous synchronization blocks the first hopping period are separated by a narrowband physical broadcast channel (NPBCH) subframe or a system information block (SIB) subframe.

40. The apparatus of claim 37, wherein one or more of the NPSS or the NSSS occupy more than eleven orthogonal frequency-division multiplexing (OFDM) symbols per subframe.

41. An apparatus for wireless communication for a user equipment (UE), the apparatus comprising:
  a memory; and
  at least one processor coupled to the memory and configured to:
    receive information indicating a narrowband frequency hopping pattern from a base station, the narrowband frequency hopping pattern including an anchor channel and a plurality of non-anchor channels, the narrowband frequency hopping pattern further including a first hopping period associated with the anchor channel and a second hopping period associated with the plurality of non-anchor channels;
    receive a plurality of narrowband synchronization signals in a synchronization signal repetition pattern during a first portion of the first hopping period on the anchor channel; and
    perform timing estimation based at least in part on the plurality of narrowband synchronization signals received during the first portion of the first hopping period.

42. The apparatus of claim 41, wherein the at least one processor is further configured to:
  receive at least one of a narrowband physical broadcast channel (NPBCH) or system information blocks (SIBs) during a second portion of the first hopping period on the anchor channel.

43. The apparatus of claim 41, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

44. The apparatus of claim 43, wherein the second set of contiguous subframes is located after the first set of contiguous subframes in a time domain.

45. The apparatus of claim 41, wherein:
  the synchronization signal repetition pattern includes a plurality of contiguous synchronization blocks; and
  each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

46. The apparatus of claim 45, wherein the NSSS subframe is located after the NPSS subframe in a time domain.

47. The apparatus of claim 45, wherein:
  the synchronization signal repetition pattern includes a greater number of NPSS than NSSS; and
  adjacent NPSS subframes located after the plurality of contiguous synchronization blocks in the first hopping period are separated by a narrowband physical broadcast channel (NPBCH) subframe or a system information block (SIB) subframe.

48. The apparatus of claim 45, wherein one or more of the NPSS or the NSSS occupy more than eleven orthogonal frequency-division multiplexing (OFDM) symbols per subframe.

49. A non-transitory computer-readable medium having stored thereon instructions that, when executed, cause at least one processor of an apparatus for wireless communication for a base station to:
  transmit information indicating a narrowband frequency hopping pattern to at least one user equipment (UE), the narrowband frequency hopping pattern including an anchor channel and a plurality of non-anchor channels, the narrowband frequency hopping pattern further including a first hopping period associated with the anchor channel and a second hopping period associated with the plurality of non-anchor channels; and
  transmit a plurality of narrowband synchronization signals using a synchronization signal repetition pattern during a first portion of the first hopping period on the anchor channel.

50. The non-transitory computer-readable medium of claim 49, further comprising instructions that, when executed by the at least one processor, cause the at least one processor to:
  transmit at least one of a narrowband physical broadcast channel (NPBCH) or system information blocks (SIBs) in a second portion of the first hopping period on the anchor channel.

51. The non-transitory computer-readable medium of claim 49, wherein the synchronization signal repetition pattern includes a set of narrowband primary synchronization signals (NPSS) in a first set of contiguous subframes on the anchor channel and a set of narrowband secondary synchronization signals (NSSS) in a second set of contiguous subframes on the anchor channel.

52. The non-transitory computer-readable medium of claim 51, wherein the second set of contiguous subframes is located after the first set of contiguous subframes in a time domain.

53. The non-transitory computer-readable medium of claim 49, wherein:

the synchronization signal repetition pattern includes a plurality of contiguous synchronization blocks; and each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

54. The non-transitory computer-readable medium of claim 53, wherein the NSSS subframe is located after the NPSS subframe in a time domain.

55. The non-transitory computer-readable medium of claim 53, wherein:

the synchronization signal repetition pattern includes a greater number of NPSS than NSSS; and adjacent NPSS subframes located after the plurality of contiguous synchronization blocks in the first hopping period are separated by a narrowband physical broadcast channel (NPBCH) subframe or a system information block (SIB) subframe.

56. The non-transitory computer-readable medium of claim 53, wherein one or more of the NPSS or the NSSS occupy more than eleven orthogonal frequency-division multiplexing (OFDM) symbols per subframe.

57. A non-transitory computer-readable medium having stored thereon instructions that, when executed, cause at least one processor of an apparatus for wireless communication for a base station to:

receive information indicating a narrowband frequency hopping pattern from a base station, the narrowband frequency hopping pattern including an anchor channel and a plurality of non-anchor channels, the narrowband frequency hopping pattern further including a first hopping period associated with the anchor channel and a second hopping period associated with the plurality of non-anchor channels;

receive a plurality of narrowband synchronization signals in a synchronization signal repetition pattern during a first portion of the first hopping period on the anchor channel; and perform timing estimation based at least in part on the plurality of narrowband synchronization signals received during the first portion of the first hopping period.

58. The non-transitory computer-readable medium of claim 57, further comprising instructions that, when executed by the at least one processor, cause the at least one processor to:

receive at least one of a narrowband physical broadcast channel (NPBCH) or system information blocks (SIBs) during a second portion of the first hopping period on the anchor channel.

59. The non-transitory computer-readable medium of claim 57, wherein the synchronization signal repetition pattern includes a first set of narrowband primary synchronization signals (NPSS) in a first set of contiguous subframes on the anchor channel and a second set of narrowband secondary synchronization signals (NSSS) in a second set of contiguous subframes on the anchor channel.

60. The non-transitory computer-readable medium of claim 59, wherein the second set of contiguous subframes is located after the first set of contiguous subframes in a time domain.

61. The non-transitory computer-readable medium of claim 57, wherein:

the synchronization signal repetition pattern includes a plurality of contiguous synchronization blocks; and each of the plurality of contiguous synchronization blocks includes a narrowband primary synchronization signal (NPSS) located in an NPSS subframe and a narrowband secondary synchronization signal (NSSS) located in an NSSS subframe that is contiguous with the NPSS subframe.

62. The non-transitory computer-readable medium of claim 61, wherein the NSSS subframe is located after the NPSS subframe in a time domain.

63. The non-transitory computer-readable medium of claim 61, wherein:

the synchronization signal repetition pattern includes a greater number of NPSS than NSSS; and adjacent NPSS subframes located after the plurality of contiguous synchronization blocks in the first hopping period are separated by a narrowband physical broadcast channel (NPBCH) subframe or a system information block (SIB) subframe.

64. The non-transitory computer-readable medium of claim 61, wherein one or more of the NPSS or the NSSS occupy more than eleven orthogonal frequency-division multiplexing (OFDM) symbols per subframe.

* * * * *